(12) United States Patent
Jang et al.

(10) Patent No.: US 9,131,098 B2
(45) Date of Patent: Sep. 8, 2015

(54) CONTENT PROCESSING APPARATUS FOR PROCESSING HIGH RESOLUTION CONTENT AND METHOD THEREOF

(71) Applicants: SAMSUNG ELECTRONICS CO., LTD., Suwon-si (KR); Gangneung-wonju National University Industry Academy Cooperation Group, Gangneung-si (KR)

(72) Inventors: Yong-seok Jang, Hwaseong-si (KR); Sung-wook Park, Gangneung-si (KR); Min-Seok Kim, Suwon-si (KR); Bong-gil Bak, Suwon-si (KR); Jae-jun Lee, Suwon-si (KR); Tae-yoon Chung, Gangneung-si (KR)

(73) Assignees: SAMSUNG ELECTRONICS CO., LTD., Suwon-si (KR); Gangueung-wonju National University Industry Academy Cooperation Group, Gangneung-si (KR)

( * ) Notice: Subject to any disclaimer, the term of this patent is extended or adjusted under 35 U.S.C. 154(b) by 62 days.

(21) Appl. No.: 13/868,173

(22) Filed: Apr. 23, 2013

(65) Prior Publication Data

US 2014/0098289 A1    Apr. 10, 2014

(30) Foreign Application Priority Data

Oct. 4, 2012  (KR) ........................ 10-2012-0110336

(51) Int. Cl.
*H04N 5/77* (2006.01)
*H04N 7/01* (2006.01)
(Continued)

(52) U.S. Cl.
CPC ............ *H04N 7/0125* (2013.01); *G11B 27/105* (2013.01); *H04N 7/0117* (2013.01); *H04N 21/4122* (2013.01); *H04N 21/435* (2013.01); *H04N 21/4325* (2013.01);
(Continued)

(58) Field of Classification Search
None
See application file for complete search history.

(56) References Cited

U.S. PATENT DOCUMENTS 7,742,107 B2   6/2010  Won
2005/0008347 A1   1/2005  Jung et al.
(Continued)

FOREIGN PATENT DOCUMENTS

EP   1 328 114 A1   7/2003
EP   2 048 666 A1   4/2009
(Continued)

OTHER PUBLICATIONS

Communication dated Dec. 6, 2013 issued by the European Patent Office in counterpart European Patent Application No. 13165201.8.
(Continued)

*Primary Examiner* — William C Vaughn, Jr.
*Assistant Examiner* — Eileen Adams
(74) *Attorney, Agent, or Firm* — Sughrue Mion, PLLC

(57) ABSTRACT

A content processing apparatus is provided. The content processing apparatus includes an input unit which receives high resolution content, a data processor which generates a video frame by processing the high resolution content, and a controller which, if an output resolution of a display panel, which is to display the video frame, is lower than the resolution of the high resolution content, controls the data processor to form an object corresponding to the high resolution content as an object for low resolution and add the object for low resolution to the video frame.

19 Claims, 20 Drawing Sheets

(51) Int. Cl.
   *H04N 21/4402* (2011.01)
   *H04N 21/462* (2011.01)
   *H04N 21/488* (2011.01)
   *G11B 27/10* (2006.01)
   *H04N 21/41* (2011.01)
   *H04N 21/432* (2011.01)
   *H04N 21/435* (2011.01)
   *H04N 5/445* (2011.01)

(52) U.S. Cl.
   CPC .. *H04N 21/440263* (2013.01); *H04N 21/4621* (2013.01); *H04N 21/4622* (2013.01); *H04N 21/4884* (2013.01); *G11B 2220/2541* (2013.01); *H04N 2005/44526* (2013.01)

(56) References Cited

U.S. PATENT DOCUMENTS

| | | | |
|---|---|---|---|
| 2006/0056716 A1 | 3/2006 | Komeno | |
| 2007/0019111 A1 | 1/2007 | Won | |
| 2007/0080971 A1* | 4/2007 | Sung | 345/545 |
| 2007/0094070 A1* | 4/2007 | Curry | 705/14 |
| 2007/0133675 A1 | 6/2007 | Honda et al. | |
| 2007/0292113 A1 | 12/2007 | Tsou et al. | |
| 2008/0279535 A1 | 11/2008 | Haque et al. | |
| 2009/0009660 A1 | 1/2009 | Kageyama et al. | |
| 2009/0138909 A1 | 5/2009 | Shimazaki | |
| 2010/0158099 A1* | 6/2010 | Kalva et al. | 375/240.01 |
| 2011/0044662 A1 | 2/2011 | Gandolph et al. | |
| 2011/0228845 A1* | 9/2011 | Banerjee | 375/240.07 |
| 2012/0188443 A1 | 7/2012 | Tsai | |
| 2012/0299986 A1* | 11/2012 | Cheng | 345/691 |

FOREIGN PATENT DOCUMENTS

| | | |
|---|---|---|
| EP | 2 051 254 A1 | 4/2009 |
| JP | 2005-142654 A | 6/2005 |
| KR | 10-2007-0013160 A | 1/2007 |

OTHER PUBLICATIONS

International Search Report (PCT/ISA/210), dated Aug. 24, 2013, issued by the International Searching Authority in counterpart International Patent Application No. PCT/KR2013/003874.

Written Opinion (PCT/ISA/237), dated Aug. 24, 2013, issued by the International Searching Authority in counterpart International Patent Application No. PCT/KR2013/003874.

Communication, dated Mar. 20, 2014, issued by the European Patent Office in counterpart European Patent Application No. 13165201.8.

* cited by examiner

CONTENT PROCESSING APPARATUS FOR PROCESSING HIGH RESOLUTION CONTENT AND METHOD THEREOF

CROSS-REFERENCE TO RELATED APPLICATION

This application claims priority from Korean Patent Application No. 10-2012-0110336, filed on Oct. 4, 2012, in the Korean Intellectual Property Office, the disclosure of which is incorporated herein by reference in its entirety.

BACKGROUND

1. Field

Methods and apparatuses consistent with exemplary embodiments relate to a content processing apparatus and a method thereof, and more particularly, to a content processing apparatus which processes high resolution content and displays an object considering an output resolution, and a method thereof.

2. Description of the Related Art

With the development of electronic technologies, various kinds of display apparatuses have been developed and distributed. Televisions (TVs) are examples of display apparatuses.

As the performance of the TV has been improved in recent years, the TV has been developed to the extent that it can display high quality content such as three dimensional (3D) content or high resolution content. In particular, the technology enabling the TV to display ultra high definition (UHD) content has been developed.

UHD content refers to content that has higher definition or resolution than that of full HD content. The number of pixels of UHD content approaches 4000 (4K) (3840×2160)–8000 (8K) levels (7680×4320). Since a screen resolution depends on the number of pixels, 4K UHD is four times clearer than the HD (1920×1080). 8K UHD is 16 times clearer than HD. Also, HD content has a refresh rate of 30 Hz, whereas the UHD has a refresh rate of 60 Hz. The refresh rate refers to the number of frames transmitted per second. That is, UHD content can transmit 60 images per second. Therefore, the user can enjoy a more natural and dynamic image.

Since high resolution content such as UHD content has many pixels, the high resolution content should be displayed on a display apparatus with a large screen. Also, in order to make a user enjoy a more realistic image, as many images as possible should come into a user's view. That is, many images should be seen from a user's wide viewing angle. The modern HD TV provides a viewing angle of 30°, whereas the UHD TV should provide a viewing angle of more than 30°.

Although image content manufacturing technologies have been developed as described above, the HD display apparatus is distributed more than the UHD display apparatus. In order to display high resolution content such as UHD content on a low resolution display apparatus, a video frame should be scaled down.

FIGS. 1 and 2 are views illustrating display states of a high resolution display apparatus and a low resolution display apparatus.

FIG. 1 illustrates UHD content which is displayed on a UHD display apparatus 10 and an HD display apparatus 20. An image frame of the UHD content comprises an object such as a subtitle 11. Since the UHD display apparatus 10 displays the UHD content of a normal size, the subtitle 11 is also large in size so that it can be recognized by a user. On the other hand, since the HD display apparatus 20 scales down the video frame of the UHD content and displays the UHD content, the subtitle 11 is also reduced in size in similar proportion. Specifically, the subtitle 11 is reduced by ¼. Therefore, it is difficult for the user to recognize the subtitle 11.

FIG. 2 illustrates UHD content which is displayed with an object such as a menu 12 being added to a video frame. The video frame may comprise various menus that can be selected to control the reproduction of the UHD content. The menu 12 is also reduced in size by ¼ on the HD display apparatus 20 and thus is difficult to recognize. Therefore, there is a problem in that it is difficult for the user to select the menu 12.

As described above, if high resolution content is reproduced by a low resolution display apparatus, there is a problem in that it is difficult to identify an object such as a subtitle or a menu.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a content processing apparatus, which can process an object included in high resolution content, such as a subtitle or a menu, according to an output resolution, so that the object can be easily identified, and a method thereof.

According to an aspect of an exemplary embodiment, there is provided a content processing apparatus including: an input unit which receives high resolution content; a data processor which generates a video frame by processing the high resolution content; and a controller which, if an output resolution of a display panel, which is to display the video frame, is lower than the resolution of the high resolution content, controls the data processor to form an object corresponding to the high resolution content as an object for low resolution and add the object for low resolution to the video frame.

The content processing apparatus may further include: a driver which, if a recording medium on which the high resolution content is recorded is mounted, detects the high resolution content from the recording medium; and an interface which, if the content processing apparatus is connected to a display apparatus including the display panel, receives display characteristic information of the display apparatus and provides the display characteristic information to the controller, and provides the video frame to which the object for low resolution is added to the display apparatus The input unit may receive the high resolution content detected by the driver.

The recording medium may store high resolution content, type information indicating a type of the high resolution content, a first object, a first navigation program or first navigation information informing that the first object is an object for high resolution, a second object, and a second navigation program or second navigation information informing that the second object is an object for low resolution. The first object and the second object may include at least one of a subtitle and a content menu.

The data processor may include: a scaler which scales down the video frame of the high resolution content; and a mixer which selectively detects one of the first object and the second object and mixes the detected object with the scaled down video frame.

If it is determined that the output resolution of the display panel is lower than the resolution of the high resolution content based on the display characteristic information, the controller may control the data processor to scale down the video frame of the high resolution content, to detect the second object according to the second navigation program or second navigation information, and to add the second object to the scaled down video frame.

The recording medium may store the high resolution content, type information indicating a type of the high resolution content, an object for high resolution, address information on a server apparatus which provides the object for low resolution.

The content processing apparatus may further include a communication module which accesses the server apparatus according to the address information.

The data processor may include: a scaler which scales down the video frame of the high resolution content; an object storage which stores an object for low resolution received from the server apparatus; and a mixer which detects whether the object for low for low resolution is recorded on the recording medium or the object for low for low resolution is stored in the object storage, and mixes the detected object for low resolution with the scaled-down video frame.

If it is determined that the output resolution of the display panel is lower than the resolution of the high resolution content based on the display characteristic information, the controller may control the communication unit to access the server apparatus using the address information and receive the object for low resolution. After the object for low resolution is received and stored in the object storage, the controller may control the data processor to scale down the video frame of the high resolution content and add the object for low resolution stored in the object storage to the scaled-down video frame.

The recording medium may store the high resolution content, type information indicating a type of the high resolution content, an object for high resolution, and object output mode information indicating whether scaling control is to be performed with respect to the object for high resolution.

The data processor may include: a first scaler which scales the video frame of the high resolution content; a second scaler which scales the object for high resolution; and a mixer which mixes the video frame which is output from the first scaler and the object which is output from the second scaler. If it is determined that the output resolution of the display panel is lower than the resolution of the high resolution content based on the display characteristic information and if it is determined that the scaling control is allowed based on the object output mode information, the controller may control the data processor to scale down the video frame of the high resolution content, to scale the object for high resolution according to a scaling ratio which is determined based on a display size and an object size of the display panel, and to mix the scaled object for high resolution with the scaled down video frame.

The content processing apparatus may further include: a receiver which receives a signal including the high resolution content through a broadcasting network and inputs the signal to the input unit; and a display which includes a display panel and displays the video frame to which the object for low resolution is added.

According to an aspect of another exemplary embodiment, there is provided a method for processing content, the method including: detecting high resolution content on a recording medium; determining an output resolution of a display apparatus to display the high resolution content; if it is determined that the output resolution of the display apparatus is lower than a resolution of the high resolution content, generating a video frame by processing the high resolution content, forming an object corresponding to the high resolution content as an object for low resolution, and adding the object for low resolution to the video frame; and providing the video frame to which the object for low resolution is added to the display apparatus.

The recording medium may store high resolution content, type information indicating a type of the high resolution content, a first object, a first navigation program or first navigation information informing that the first object is an object for high resolution, a second object, and a second navigation program or second navigation information informing that the second object is the object for low resolution, and the first object and the second object may include at least one of a subtitle and a content menu.

The generating the video frame may include: if it is determined that the output resolution is lower than the resolution of the high resolution content, scaling down the video frame of the high resolution content, selectively detecting the second object using the second navigation program or second navigation information, and adding the second object to the scaled down video frame; and if it is determined that the output resolution is a high resolution corresponding to the high resolution content, selectively detecting the first object using the first navigation program or first navigation information and mixing the first object with the video frame of the high resolution content.

The recording medium may store the high resolution content, type information indicating a type of the high resolution content, an object for high resolution, address information on a server apparatus which provides the object for low resolution.

The generating the video frame may include: if it is determined that the output resolution is lower than the resolution of the high resolution content, scaling down the video frame of the high resolution content, accessing the server apparatus using the address information and receiving the object for low resolution, and mixing the received resolution object with the scaled down video frame; and if it is determined that the output resolution is a high resolution corresponding to the high resolution content, mixing the object for high resolution with the video frame of the high resolution content.

The recording medium may store the high resolution content, type information indicating a type of the high resolution content, an object for high resolution, and object output mode information indicating whether scaling control is to be performed with respect to the object for high resolution.

The generating the video frame may include: if it is determined that the output resolution is lower than the resolution of the high resolution content and if it is determined that the scaling control is allowed based on the object output mode information, scaling down the video frame of the high resolution content, scaling the object for high resolution according to a scaling ratio which is determined based on a display size and an object size of the display apparatus, and mixing the object for high resolution with the scaled down video frame; if it is determined that the output resolution is a low resolution and if it is determined that the scaling control is not allowed based on the object output mode information, scaling down the video frame of the high resolution content, scaling down the object for high resolution according to the output resolution, and mixing the scaled down high resolution object with the video frame; and if it is determined that the output resolution is a high resolution corresponding to the high resolution content, mixing the object for high resolution with the video frame of the high resolution content.

According to an aspect of still another exemplary embodiment, there is provided a non-transitory readable medium which stores a program to perform a method for processing content, the method including: receiving high resolution content; generating a video frame by processing the high resolution content; and if an output resolution of a display panel to display the video frame is lower than the resolution of the high resolution content, forming an object corresponding to the high resolution content as an object for low resolution and adding the object for low resolution to the video frame.

According to an aspect of still another exemplary embodiment, there is provided a recording medium including: a first storage region in which high resolution content is stored; a second storage region in which type information indicating a type of the high resolution content is stored; a third storage region in which an object for high resolution is stored; and a fourth storage region in which additional information for displaying an object is stored, wherein the additional information includes at least one of a first navigation program or information to indicate the object for high resolution, an object for low resolution, a second navigation program or information to indicate the object for low resolution, address information on a server apparatus which provides the object for low resolution, and object output mode information indicating whether scaling control is to be performed with respect to the object for high resolution.

According to the various exemplary embodiments described above, even if a resolution of content is different from a resolution of a display apparatus, an object such as a subtitle or a menu is displayed so that the object can be easily identified.

BRIEF DESCRIPTION OF THE DRAWINGS

The above and/or other aspects will be more apparent by describing in detail exemplary embodiments, with reference to the accompanying drawings, in which.

DETAILED DESCRIPTION OF THE EXEMPLARY EMBODIMENTS

Figure 1:
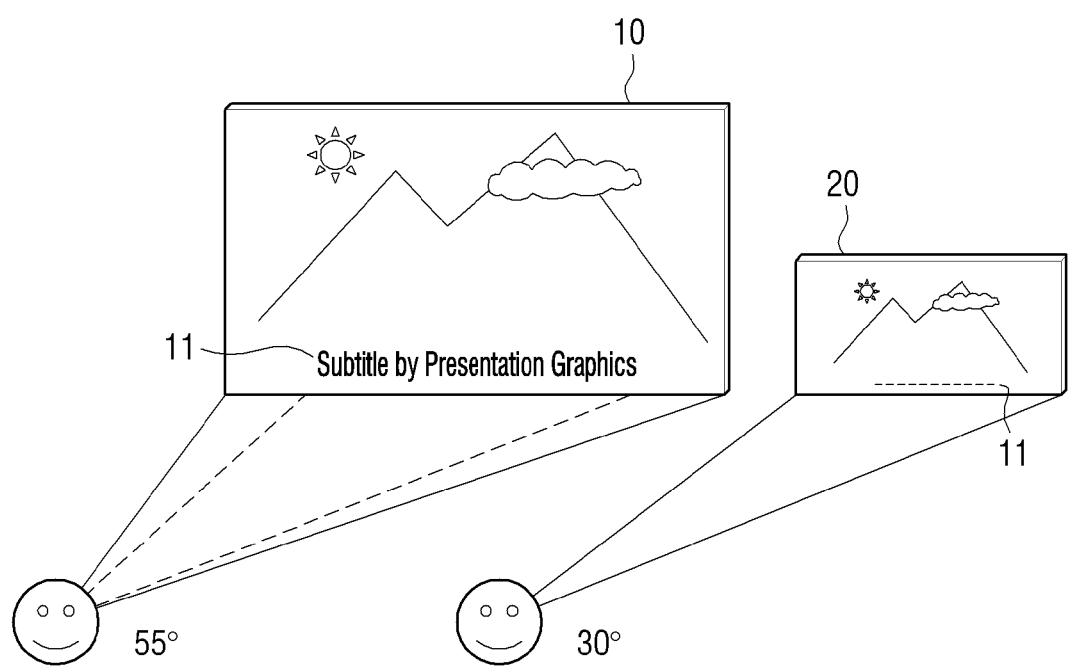
FIGS. 1 and 2 are views to illustrate problems of the related art.
Figure 2:
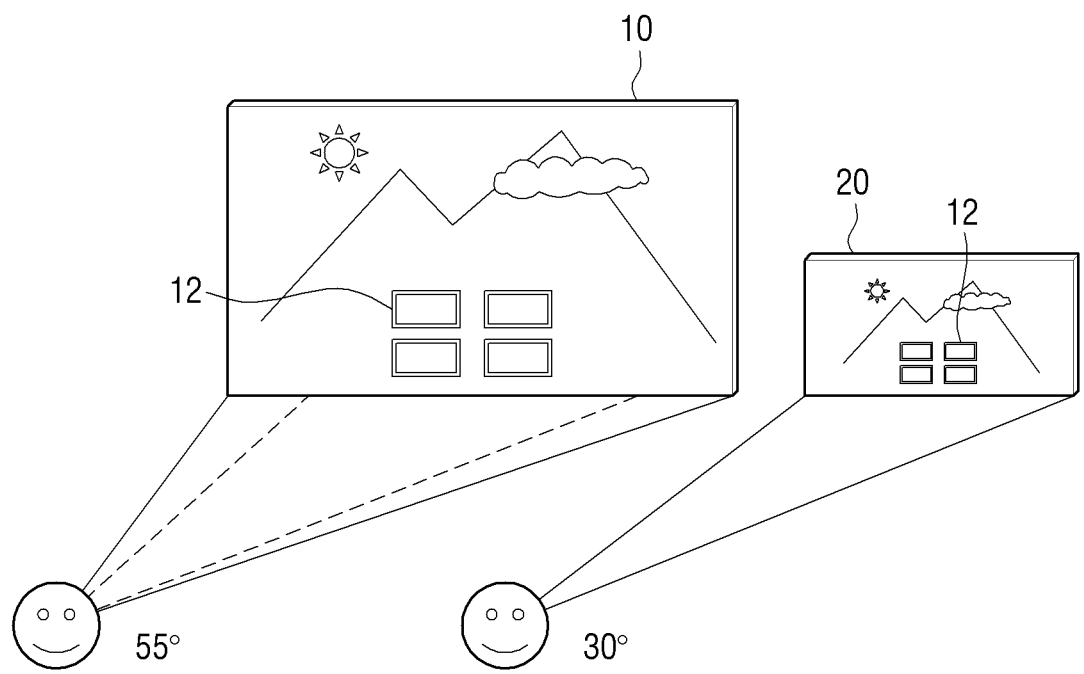

Hereinafter, exemplary embodiments will be described in greater detail with reference to the accompanying drawings.

In the following description, same reference numerals are used for the same elements when they are depicted in different drawings. The matters described in the description, such as detailed construction and elements, are provided to assist in a comprehensive understanding of exemplary embodiments. Thus, it is apparent that exemplary embodiments can be carried out without those specifically described matters. Also, well known functions or elements known are not described in detail since they would obscure the exemplary embodiments with unnecessary detail.

Figure 3:
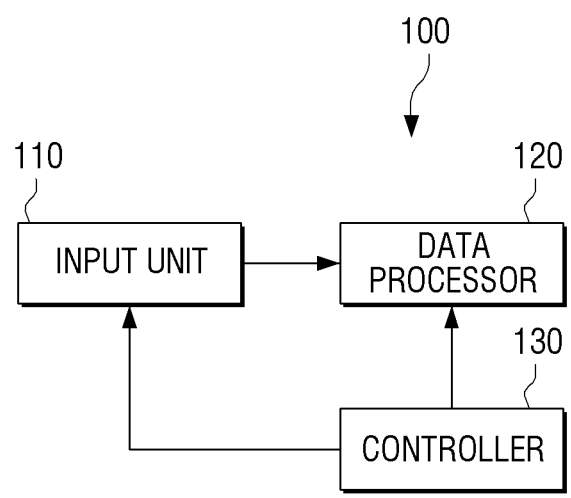
FIG. 3 is a block diagram illustrating a content processing apparatus according to an exemplary embodiment.

FIG. 3 is a block diagram illustrating a content processing apparatus according to an exemplary embodiment. A content processing apparatus 100 may be embodied by various apparatuses such as a recording medium reproducing apparatus, a television, a personal computer (PC), a laptop PC, and a set-top box, or may be embodied in a form of a signal processing module mounted on these apparatuses.

Referring to FIG. 3, the content processing apparatus 100 includes an input unit 110 (e.g., an input device), a data processor 120, and a controller 130.

The input unit 110 is configured to receive high resolution content.

The data processor 120 generates a video frame by processing the high resolution content which is input through the input unit 110. The data processor 120 may include a demultiplexer to detect video data, audio data, and additional data from the high resolution content, a video decoder to decode the video data, a scaler, an audio decoder to decode the audio data, a filter to filter noise, a signal amplifier to amplify an audio signal, a data decoder to process the additional data, a renderer to generate an object according to the decoded additional data, and a mixer. A process of processing the audio data is not illustrated and not described.

The controller 130 controls the input unit 110 and the data processor 120 to process the high resolution content. Specifically, the controller 130 checks an output resolution of a display panel which will display the video frame. If the content processing apparatus 100 is embodied in a form of a recording medium reproducing apparatus, the controller 130 checks an output resolution of a display panel which is provided in an external display apparatus to which the content processing apparatus 100 is connected. On the other hand, if the content processing apparatus 100 is embodied in a form of a display apparatus, the controller 130 checks an output resolution based on characteristic information of the content processing apparatus 100.

If the output resolution of the display panel is a low resolution (e.g., the display panel's resolution is lower than the resolution of the high resolution content), the controller 130 controls the data processor 120 to scale down the video frame of the high resolution content, form an object to be added to the video frame, such as a subtitle or a menu, as an object for low resolution, and add the object to the video frame.

The low resolution recited herein refers to a resolution that is relatively lower than that of the content. For example, if the content is UHD content that has a resolution of 4000 (3840× 2160) to 8000 (7680×4320) levels, an output resolution of an HD display apparatus having a resolution of 1920×1080 would be considered a lower resolution display apparatus. Hereinafter, the high resolution content refers to UHD content and the low resolution display panel or apparatus refers to a display panel or apparatus having the HD resolution by way of an example. However, this should not be considered as limiting. For example, the exemplary embodiments may be applied if the resolution of the content is higher than that of the display panel or apparatus.

The video frame to which the object for low resolution is added by the data processor 120 is provided to the display panel and displayed on the display panel. Accordingly, even if the high resolution content is displayed through the display panel which has a relatively lower resolution, the size of the subtitle or the menu can be prevented from being reduced in proportion to the resolution and thus the user can easily identify the subtitle or the menu.

Also, as described above, the content processing apparatus of FIG. 3 may be embodied in a form of a recording medium reproducing apparatus or a display apparatus.

Figure 4:
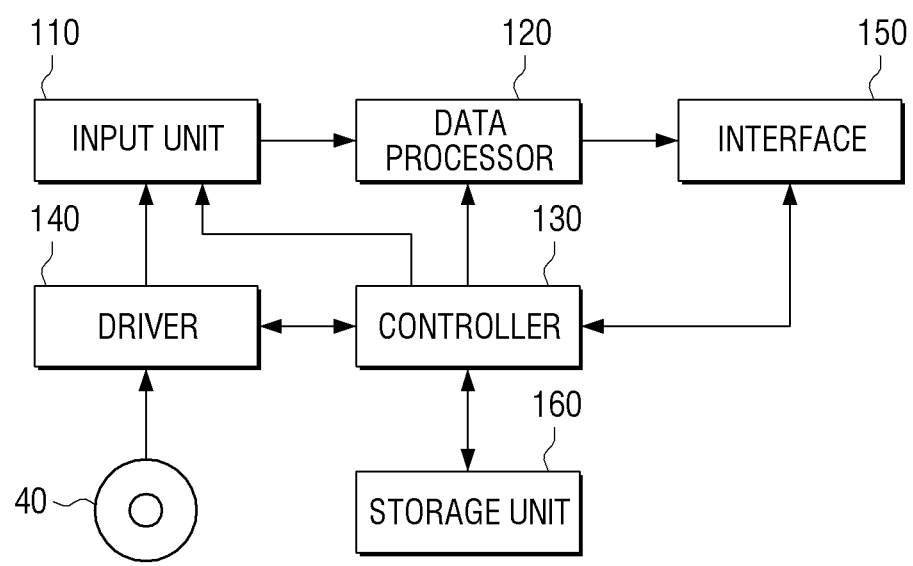
FIG. 4 is a block diagram illustrating an example of a content processing apparatus which is embodied in a form of a recording medium reproducing apparatus.

FIG. 4 is a block diagram illustrating an example of a content processing apparatus which is embodied in a form of a recording medium reproducing apparatus. The recording medium recited herein refers to various types of media such as a Blu-ray disk, an optical disk such as a holographic disk, a USB memory stick, and an external hard drive. Hereinafter, the content processing apparatus which is a Blu-ray disk reproducing apparatus which reproduces a Blu-ray disk 40 will be explained by way of an example.

The content processing apparatus 100 includes an input unit 110, a data processor 120, a controller 130, a driver 140, an interface 150, and a storage unit 160 (e.g., a storage device, storage, etc.).

The driver 140 is an element that drives a recording medium mounted thereon and detects data. If the content processing apparatus 100 is embodied by an apparatus that can process the Blu-ray disk 40 as described above, the driver 140 may include a tray to move up an optical disk, a motor to rotate the optical disk, a connector connected to a main board to transmit or receive various data, a power connector to receive power from a power supply apparatus, an optical pickup unit to record signals on the optical disk by emitting laser and read out signals, an object lens, a digital signal processor (DSP) to control an overall operation of the driver 140 and operate the driver 140, and a front end processor (FEP) to control the laser emitting operation of the optical pickup unit and interpret the received signals.

If it is determined that a recording medium on which high resolution content is recorded is mounted on the driver 140, the controller 130 controls the driver 140 to detect the high resolution content from the recording medium.

The high resolution content detected by the driver 140 is input to the input unit 110. The input unit 110 provides the high resolution content to the data processor 120. The data processor 120 generates a video frame of the high resolution content, forms an object for low resolution, and adds the object to the video frame under control of the controller 130 as described above. In the case of a Blu-ray disk, image data which is compressed by a codec according to MPEG-2 or H.264/MPEG-4 AVC, or VC-1 standards may be stored. The data processor 120 decodes the image data using such a codec and generates the video frame.

The interface 150 is an element to be connected to a display apparatus which includes a display panel. Specifically, the interface 150 may be embodied by a high definition multimedia interface (HDMI).

The controller 130 transmits the video frame which is processed by the data processor 120 to the external display apparatus through the interface 150. Accordingly, the video frame to which the object for low resolution is added may be transmitted to the external display apparatus.

The storage unit 160 is an element that stores an operating system (OS) or various programs and data necessary for operating the content processing apparatus 100. The storage unit 160 may store information such as an output resolution of the display apparatus to which the content processing apparatus 100 is connected. The output resolution information may be received from the display apparatus 300 and stored in the storage unit 160. That is, the controller 130 may store various data which is received from the display apparatus through the interface 150 in the storage unit 160.

The controller 130 may receive display characteristic information from the display apparatus through the interface 150. The display characteristic information may include a variety of information such as an output resolution of a display panel provided in the display apparatus, a pixel count, a display size, a viewing distance, and an apparatus model name. If the interface 150 is embodied by an HDMI as described above, the controller 130 may obtain extended display identification data (EDID). The controller 130 may determine whether a currently connected display apparatus is a low resolution display apparatus using a maximum horizontal image size, a maximum vertical image size, or an established timing bitmap and soon. The display characteristic information may be referred to as viewing environment information, reproducing environment information, resolution information, or EDID. However, hereinafter, the display character information will be used uniformly. The controller 130 stores the display characteristic information in the storage unit 160 and uses the display characteristic information. If the display apparatus and the content processing apparatus are connected to each other through the HDMI, the content processing apparatus 100 may automatically obtain the display characteristic information such as screen size information and may store the display characteristic information therein as viewing environment information. On the other hand, if the display apparatus and the content processing apparatus are connected to each other in an analogue connecting method or if the display characteristic information is not available for other reasons, viewing environment information may be generated based on a setting value generated at the manufacturing time or a user setting value, and may be stored in the storage unit 160.

The controller 130 may identify an output resolution of a display panel which will display the video frame of the high resolution content using the display characteristic information stored in the storage unit 160. According to another exemplary embodiment, the content processing apparatus 100 may provide a user interface (UI) to determine the output resolution. The UI may be displayed by a touch screen panel which is provided in the content processing apparatus 100 or the display apparatus. The output resolution which is input by the user through the UI is stored in the storage unit 160.

A method for generating an object for low resolution may be embodied in various ways according to exemplary embodiments. For example, an object for low resolution may be stored in a recording medium separately from an object for high resolution or may be provided from a source apparatus rather than a recording medium or another recording medium. Also, an object for high resolution may be converted into an object for low resolution. The configuration and operation of the data processor 120 may be different according to exemplary embodiments. Hereinafter, various exemplary embodiments for generating an object for low resolution will be explained in detail.

Figure 5:
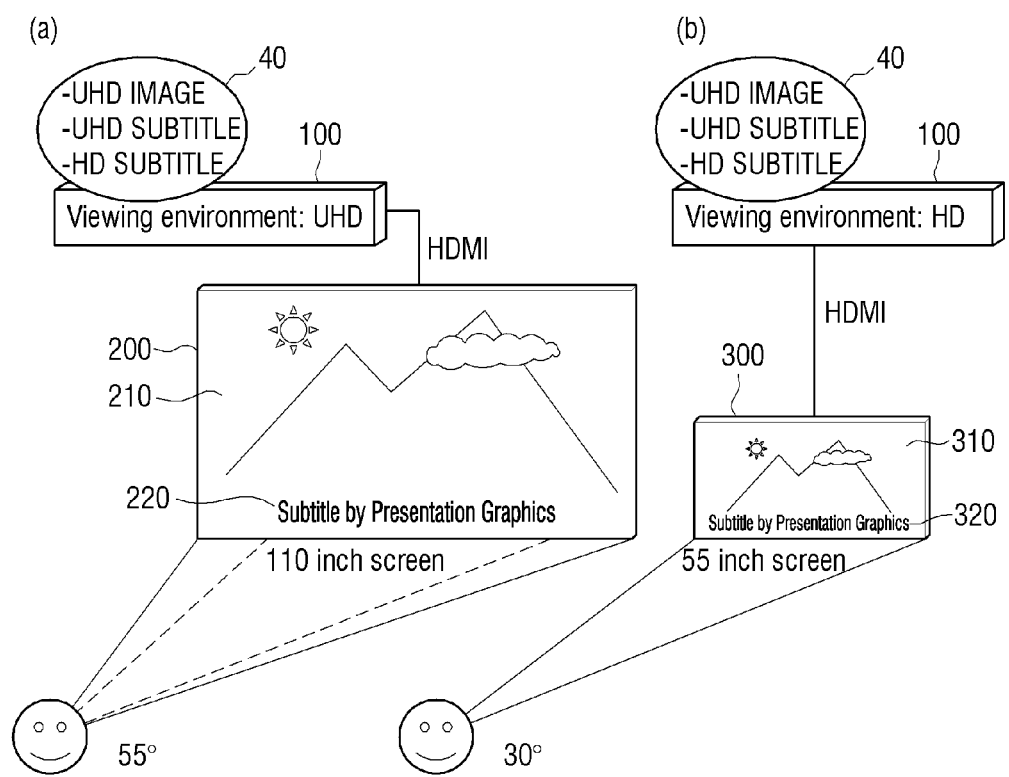
FIG. 5 is a view to explain a method for displaying an object in a content processing apparatus according to a an exemplary embodiment.

FIG. 5 is a view to explain an operation of the content processing apparatus according to an exemplary embodiment in which an object for low resolution is stored in a recording medium.

Referring to FIG. 5, a UHD image, a UHD subtitle, and an HD subtitle are stored in a disk 40. The UHD image refers to high resolution content and the UHD subtitle refers to an object for high resolution. The HD subtitle refers to an object for low resolution. Although the object may include various graphic menus besides the subtitle as described above, a process of processing a subtitle will be mainly described for convenience of explanation.

If the disk 40 is mounted on the content processing apparatus 100, the content processing apparatus 100 identifies display characteristic information of a connected display apparatus. FIG. 5 illustrates a case (a) in which the content processing apparatus 100 is connected to a UHD display apparatus 200, and also illustrates a case (b) in which the content processing apparatus 100 is connected to an HD display apparatus 300.

If the content processing apparatus 100 is connected to the UHD display apparatus 200 as shown in (a) of FIG. 5, the controller 130 of the content processing apparatus 100 adds a UHD subtitle 220 to an image frame 210 having UHD resolution and provides the image frame 210 having the UHD subtitle 220. Accordingly, the user is able to view the high resolution content through a large screen (about 110 inches) of the UHD display apparatus 200. The UHD image 210 is manufactured to fit to a screen size of the UHD display apparatus 200. However, it is common that the user views the UHD display apparatus 200 and the HD display apparatus 300 at the same distance. Since a size of viewing area increases at the same distance, the user who watches the image through the UHD display apparatus 200 can obtain a wide viewing angle (about 55°). Although a viewing distance is the same as that of the HD display apparatus 300, it is difficult to generate a subtitle or a menu four times larger than that of the HD display apparatus 300 even if the screen size increases. In other words, the subtitle 220 is generated to still have a size in which the user easily views the subtitle 220 at the same distance as that of the HD display apparatus 300. Thus, if the UHD image and the UHD subtitle or menu are output through the HD display apparatus 300, the subtitle or the menu is reduced by about ¼ and thus is difficult to read. However, if the subtitle or the menu is adjusted for the low resolution by the content processing apparatus 100, the size can be maintained appropriately.

Case (b) of FIG. 5 illustrates a case in which the content processing apparatus 100 is connected to the HD display apparatus 300. In this case, the content processing apparatus 100 scales down the UHD image to fit to the display size of the HD display apparatus 300. The content processing apparatus 100 mixes the HD subtitle 320 with the scaled-down video frame and provides the video frame having the HD subtitle 320 to the HD display apparatus 300. The HD display apparatus 300 receives the non-compressed video frame through the HDMI as it is and outputs the video frame on the screen. As a result, since the video frame 310 of the UHD image is reduced to fit to the HD size but the HD subtitle 320 is used, the size of the subtitle 320 is the same as that of the original subtitle or is not greatly reduced. Accordingly, the user can easily identify the subtitle.

In order for the content processing apparatus 100 to perform the above-described operation, the disk 40, which is a recording medium, may store a variety of information.

Specifically, the disk 40 according to the present exemplary embodiment may store high resolution content, type information indicating a type of the high resolution content, a first object, a first navigation program for using the first object, a second object, and a second navigation program for using the second object.

The high resolution content refers to content such as a UHD image described above. The type information is information indicating whether the content is UHD content or an HD content.

As described above, the content processing apparatus 100 requires display characteristic information to determine whether a screen to display the content is a high resolution screen or an HD screen. The display characteristic information is necessary for selecting and outputting an object appropriate to the screen, whereas the type information is selectively recorded.

The first object refers to an object for high resolution, that is, a UHD object, and the second object refers to an object for low resolution, that is, an HD object. Each of the first object and the second object may include at least one of a subtitle and a menu. These objects may be stored in an image data format. However, this should not be considered as limiting. That is, the objects may be stored in a text format.

The first navigation program is a program that navigates the controller 130 to determine that the first object is an object for high resolution and to use the first object. The second navigation program is a program that navigates the controller 130 to determine that the second object is an object for low resolution and to use the second object.

The controller 130 may determine a type of the content of the disk using the type information. The controller 130 determines an output resolution based on the display characteristic information of the display apparatus 200 or 300, and determines which of the UHD display apparatus 100 normally outputs the content recorded on the disk 40 or the HD display apparatus 300.

If the connected display apparatus is the UHD display apparatus 200, the controller 130 selects and processes the first object using the first navigation program. On the other hand, if the connected display apparatus is the HD display apparatus 300, the controller 130 selects and processes the second object using the second navigation program. The navigation program is a program that is created by a content manufacturer using a disk managing navigation command in order to select and output a UHD object or an HD object. Instead of the navigation program, the content manufacturer may provide navigation information including an identifier to identify whether each subtitle is for the HD or the UHD. Therefore, according to another exemplary embodiment, the disk 40 may record first and second navigation information instead of the first and second navigation programs.

Since the type information is optional information that is selectively recorded as described above, the content manufacturer may not record the type information of the content.

If the content manufacturer does not record the type information of the content, the controller 130 may perform the above-described operation with respect to objects other than the image content based on information reflecting characteristics of the display apparatus.

For example, if the content processing apparatus 100 is connected to the HD display apparatus 300, the controller 130 controls the data processor 120 to add the HD subtitle or HD menu to the video frame without determining whether the content is UHD or HD. On the other hand, if the content processing apparatus 100 is connected to the UHD display apparatus, the controller 130 selects the object such as a subtitle or a menu for the UHD and controls the data processor 120 to add the selected object to the video frame. As a result, if the type information is not available, the content processing apparatus 100 just adjusts the object to fit to the screen size without separately processing the image.

Figure 6:
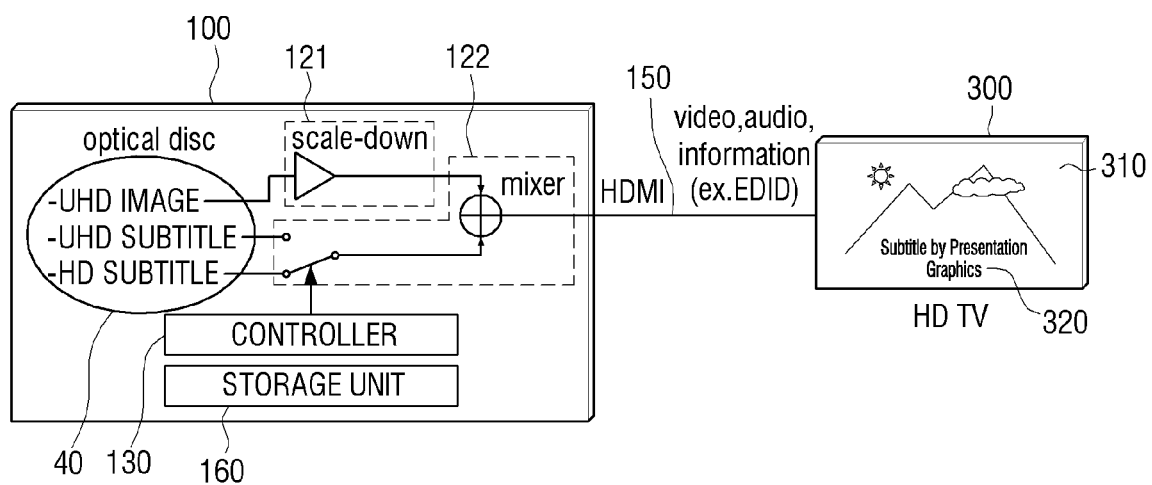
FIG. 6 is a view to explain an operation of a content processing apparatus according to an exemplary embodiment.

FIG. 6 is a view to explain an operation of the content processing apparatus according to the above-described exemplary embodiment. Referring to FIG. 6, the data processor 120 of the content processing apparatus 100 includes a scaler 121 and a mixer 122.

The scaler 121 is configured to scale the video frame of the high resolution content stored in the disk 40. The mixer 122 is configured to selectively detect one of the first object and the second object stored in the disk 40 and mix the selected object with the video frame which has been scaled by the scaler 121.

If the content processing apparatus is connected to a display apparatus through the interface 150, the controller 130 receives display characteristic information and stores the display characteristic information in the storage unit 160. The display characteristic information may be EDID as described above. If it is determined that the content processing apparatus is connected to the HD display apparatus 300 based on the display characteristic information, the controller 130 controls the scaler 121 to scale down the video frame of the high resolution content according to an output resolution of the display apparatus 300.

The controller 130 loads the second navigation program stored in the disk 40 into the storage unit 160. The controller 130 may include a micom (microcomputer) or a central processing unit (CPU), and the storage unit 160 may include various memories such as a read only memory (ROM), a random access memory (RAM), a flash memory, and a hard disk drive (HDD). The controller 130 detects the second object from a storage location of the second object using the second navigation program, and then controls the mixer 122 to mix the second object with the video frame which has been processed by the scaler 121. The interface 150 transmits the video frame which has been mixed with the second object by the mixer 122 to the display apparatus 300. Accordingly, the display apparatus 300 displays an image in which an object for low resolution 320 is added to a scaled down video frame 310 of the high resolution content.

On the other hand, if it is determined that the content processing apparatus is connected to the UHD display apparatus, the controller 130 controls the scaler 121 to scale a UHD image frame according to the size of the UHD display apparatus, and controls the mixer 122 to mix the first object, that is, the UHD object with the UHD image frame.

According to the exemplary embodiment described above, an object such as a subtitle or a menu is separately provided for the high resolution and the low resolution and is stored in the disk 40. The content processing apparatus 100 appropriately selects one of the objects according to the output resolution so that the user can easily identify the object.

The disk 40 may have a storage capacity insufficient to store both the object for high resolution and the object for low resolution. Therefore, the object for low resolution may be provided using a separate server apparatus according to an exemplary embodiment.

Figure 7:
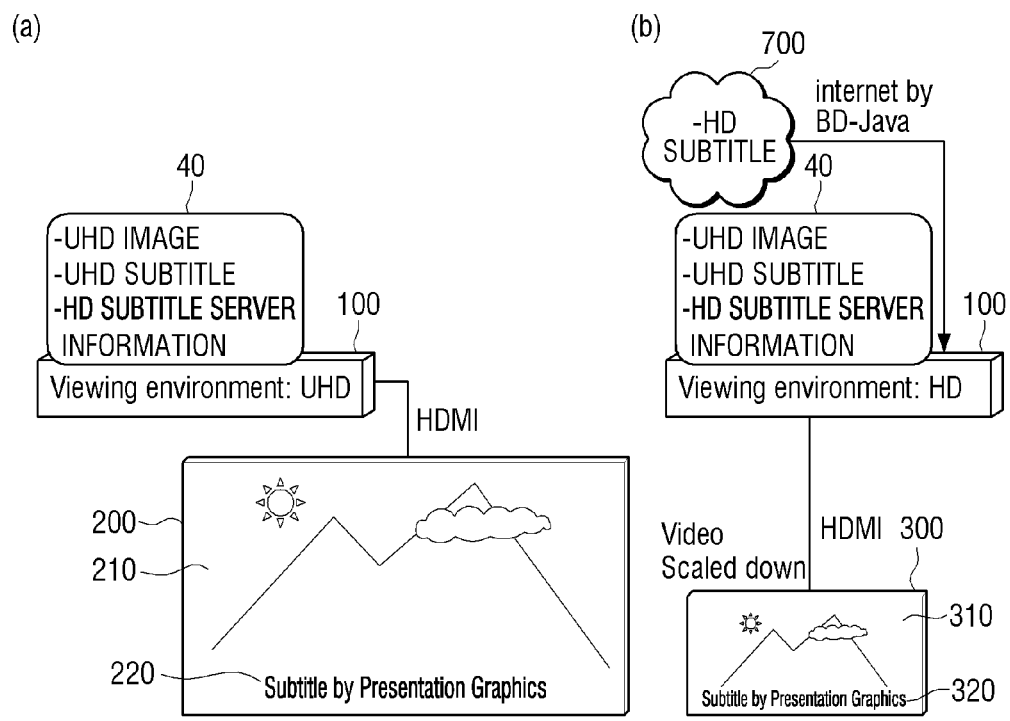
FIG. 7 is a view to explain a method for displaying an object in a content processing apparatus according to an exemplary embodiment.

FIG. 7 is a view to explain an operation of a content processing apparatus according to an exemplary embodiment. In the exemplary embodiment of FIG. 7, high resolution content, type information indicating a type of the high resolution content, an object for high resolution, and address information may be stored in a recording medium. The address information refers to information on an address of a server apparatus that provides an object for low resolution. The address information may be stored in a format of identification information such as a URL or an IP address of the server apparatus or a server name, or in a format of a JAVA program. In general, a movie recorded on a recording medium of an optical disk form is released within one month after the movie has been shown at a theater. It may be difficult to make subtitles or menus corresponding to various display environments within such a short time. Therefore, the subtitles or menus may be provided using a server apparatus after the optical disk has been released.

FIG. 7 illustrates a case (a) in which the content processing apparatus for processing UHD content is connected to a UHD display apparatus 200. In this case (a), a UHD subtitle stored in the disk 40, that is, an object for high resolution may be used as it is. Therefore, the UHD display apparatus 200 displays a UHD image frame 210 to which a UHD subtitle 220 is added.

FIG. 7 illustrates a case (b) in which the content processing apparatus for processing the UHD content is connected to an HD display apparatus 300. In this case (b), the content processing apparatus 100 accesses a server apparatus 700 using address information stored in the disk 40 and receives a HD object. The received low HD object is added to the scaled down video frame and is provided to the HD display apparatus 300. Accordingly, an HD subtitle 320 and a video frame 310, which are in accord with an output resolution and a display size of the HD display apparatus 300, are displayed.

Figure 8:
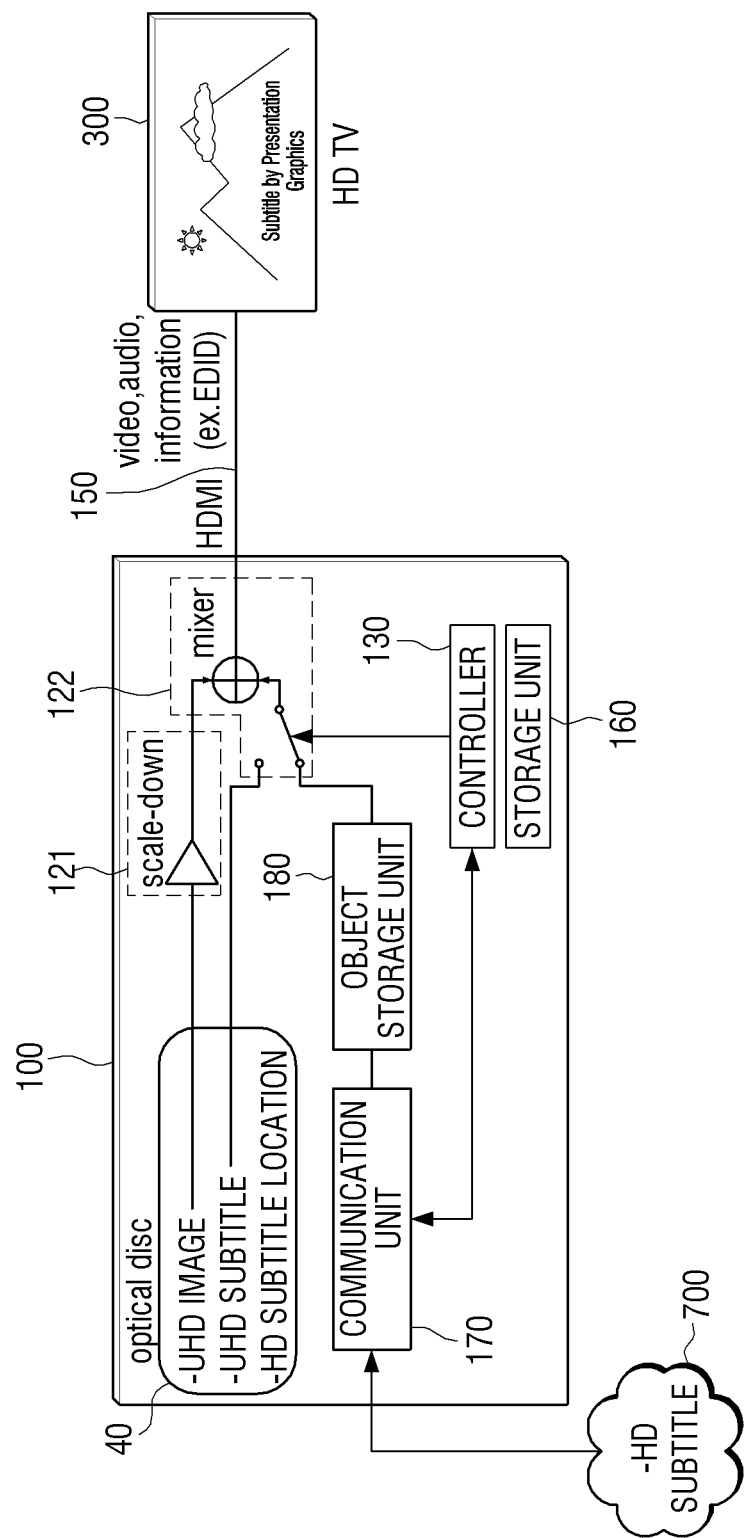
FIG. 8 is a view to explain an operation of a content processing apparatus according to an exemplary embodiment.

FIG. 8 illustrates an example of an internal configuration of the content processing apparatus according to the exemplary embodiment of FIG. 7. Referring to FIG. 8, the content processing apparatus 100 may further include a communication unit 170 (e.g., a communication device, communication module, communicator, etc.) and an object storage unit 180, besides the input unit 110, the data processor 120, the controller 130, the driver 140, the interface 150 and storage unit 160.

The communication unit 170 is an element to communicate with an external server apparatus using address information stored in the disk 40. The communication unit 170 may access the server apparatus using Wi-Fi, IEEE, Bluetooth, or local area network (LAN). The server apparatus may be a server apparatus that is operated by a content manufacturer, a content processing apparatus manufacturer, or a display apparatus manufacturer.

If an object for low resolution is downloaded from the server apparatus, the communication unit 170 stores the object for low resolution in the object storage unit 180. Although the object storage unit 180 is provided separately from the storage unit 160 in FIG. 8, in the other embodiment, the object storage unit 180 may be included in the storage unit 160.

The data processor 120 may include a scaler 121 and a mixer 122. If it is determined that the output resolution is a low resolution based on display characteristic information, the controller 130 controls the communication unit 170 to access the server apparatus 700 using the address information and receive the object for low resolution. Accordingly, if the object for low resolution is received and stored in the object storage unit 180, the controller 130 controls the scaler 121 to scale down the video frame of the content. The controller 130 may control the mixer 122 to add the object for low resolution stored in the object storage unit 180 to the scaled down video frame.

On the other hand, if it is determined that the output resolution is a high resolution, the controller 130 controls the mixer 122 to mix a UHD subtitle stored in the disk 40 to the UHD image frame. Accordingly, the object such as a subtitle or a menu can be displayed according to an output characteristic of the display apparatus.

Unlike in the above-described exemplary embodiments, an object for low resolution may be generated by scaling an object for high resolution.

Figure 9:
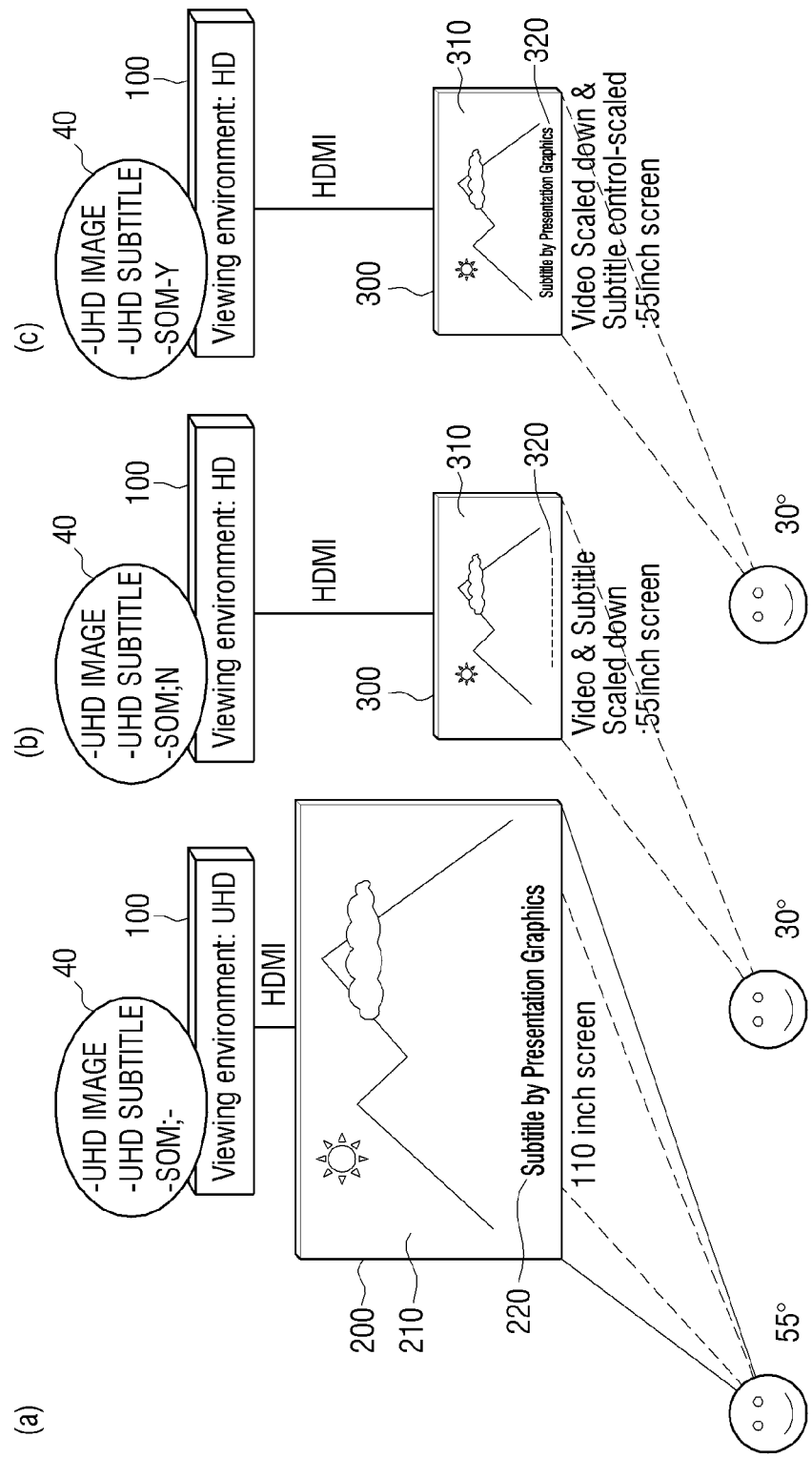
FIG. 9 is a view to explain a method for displaying an object in a content processing apparatus according to an exemplary embodiment.

FIG. 9 is a view to explain an operation of a content processing apparatus which generates an object for low resolution by scaling an object for high resolution according to an exemplary embodiment. According to an exemplary embodiment, a recording medium 40 such as a disk may store high resolution content, type information indicating a type of the high resolution content, an object for high resolution, and object (subtitle or menu) output mode information.

The object output mode information is information indicating whether scaling of an object for high resolution is allowed or not. That is, the object output mode information may include a bit value corresponding 'Yes' or a bit value corresponding to 'No'. The object output mode information may be determined by content manufacturer's intention. That is, some manufacturers may not want the content processing apparatus 100 to determine a difference between content and a viewing environment and process the content. Considering this case, a means for preventing the content processing apparatus from scaling an object should be provided to the manufacturer. The object output mode information serves as such a means.

FIG. 9 illustrates a case (a) in which the content processing apparatus 100 is connected to a UHD display apparatus 200. In this case, the controller 130 adds a UHD subtitle 220 to a UHD image frame 210 without identifying the object output mode information, and provides the UHD subtitle 220 and the UHD image frame 210 to the UHD display apparatus 200.

In case (b) and case (c) of FIG. 9 illustrate cases in which the content processing apparatus 100 is connected to an HD display apparatus 300.

In this case, the controller 130 identifies the object output mode information. If the object output mode information is a value of No, the controller 130 scales down an object for high resolution 320 by ¼, adds the object for high resolution to a video frame, and provides the video frame to the HD display apparatus 300. In this case, the subtitle is scaled at the same ratio as the video frame and thus is reduced in size.

On the other hand, if the object output mode information is a value of Yes, the controller 130 scales down the object for high resolution considering an output resolution and a display size of the HD display apparatus 300. In this case, as shown in case (c) of FIG. 9, a subtitle 320 is converted into a subtitle of an appropriate size, is added to the scaled down video frame 310, and is provided to the HD display apparatus 300.

Figure 10:
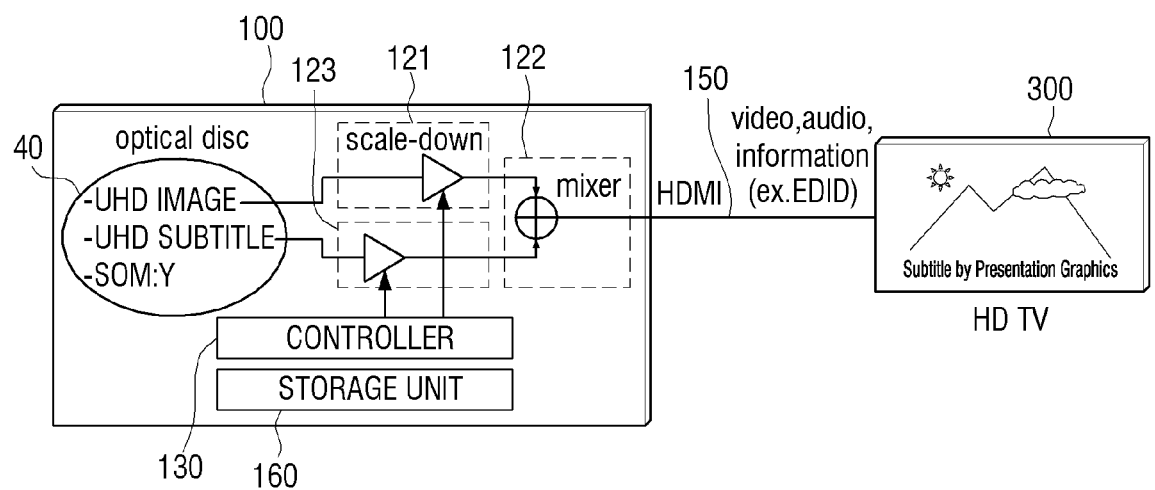
FIG. 10 is a view to explain an operation of a content processing apparatus according to an exemplary embodiment.

FIG. 10 is a view illustrating an internal configuration of the content processing apparatus 100 according to the exemplary embodiment of FIG. 9. Referring to FIG. 10, the data processor 120 includes a first scaler 121, a mixer 122, and a second scaler 123.

The first scaler 121 is configured to scale a video frame of high resolution content. The second scaler 123 is configured to scale an object for high resolution. The mixer 122 mixes the video frame which is output from the first scaler 121 and the object which is output from the second scaler 123.

If it is determined that the output resolution of the display panel is a low resolution based on the display characteristic information, the controller 130 identifies the object output mode information. If the object output mode information has a value of Yes, the controller 130 determines that scaling of the object is allowed. Accordingly, the controller 130 controls the data processor 120 to scale down the video frame of the high resolution content and the object for high resolution, respectively, and mix the video frame and the object with each other. A scaling ratio of the object for high resolution may be determined based on a display size of the display apparatus and a size of the object. This will be explained below with reference to the relevant drawings.

On the other hand, if the object output mode information is a value of No, the controller 130 determines that scaling control of the object is not allowed. Accordingly, the controller 130 controls the data processor 120 to scale down the video frame of the high resolution content and mix the object for high resolution with the video frame as it is.

If the object for high resolution is scaled down, the controller 130 may adjust the scaling ratio not to excessively scale down the object.

Figure 11:
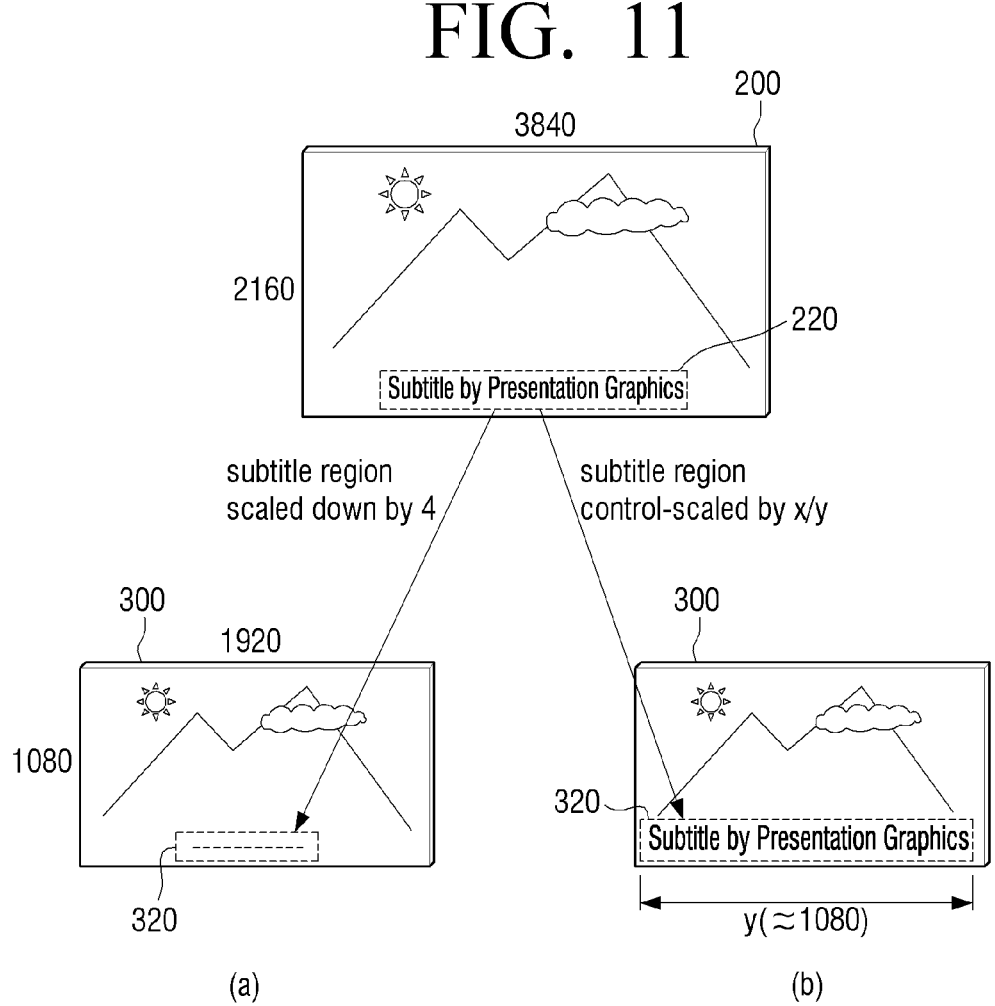
FIG. 11 is a view to explain an operation of adjusting a degree of scaling of an object by the content processing apparatus according to an exemplary embodiment.

FIG. 11 is a view to explain a method for adjusting a scaling ratio of an object considering a display size. The controller 130 of the content processing apparatus 100 may perform a scaling control operation with respect to an object such as a subtitle or a menu. The scaling control operation may refer to an operation of scaling an object by adjusting a scaling ratio using information on a size and a location of the object provided with reference to a UHD screen, so that the object can be easily identified on a screen of an HD display apparatus.

If a downscaling ratio is set to a small value such as 4, a small subtitle 320 is displayed as shown in case (a) of FIG. 11. On the other hand, if the downscaling ratio is set to a very small value, a width of the high resolution subtitle is larger than that of the HD display apparatus 300 and thus a part of the subtitle may be lost. Therefore, the controller 130 may adjust the downscaling ratio by comparing the real width of the high resolution subtitle and the width of the HD display apparatus 300.

As shown in FIG. 11, if a width of a subtitle 220 on the UHD display apparatus 200 is 'x' and 'x' is a sufficiently small value, the controller 130 may set the downscaling ratio to 1:1. Accordingly, the user can view the original subtitle even on the HD display apparatus 300. However, if 'x' is a sufficiently great value, the controller 130 scales the subtitle at the downscaling ratio of y/x and adds the subtitle to the video frame. 'y' may be set to a value that is a little less than the width of the HD display apparatus 300. In case (b) of FIG. 11, 'y' is set to about 1080 pixels. Accordingly, a part of the subtitle is not lost and the subtitle can be displayed so that the user can easily identify the subtitle.

As described above, the controller 130 may adaptively determine the scaling ratio considering the display size and the object size.

In the above exemplary embodiments, a disk is used as an example of the recording medium. Specifically, a mass storage recording medium that can store UHD content such as a Blu-ray disk or a holographic disk may be used. Such a recording medium may record a variety of information thereon according to exemplary embodiments as described above. In an exemplary embodiment, the first navigation program and the second navigation program may be stored. However, navigation information such as an identifier rather than information of a program format may be stored and provided to the controller 130.

A storage region of the recording medium may be divided into a plurality of storage regions according to a type of information recorded thereon. For example, the recording medium may include a first storage region to store high resolution content, a second storage region to store type information indicating a type of the high resolution content, a third storage region to store an object for high resolution, and a fourth storage region to store additional information for displaying an object.

The additional information varies according to an exemplary embodiment. For example, the additional information may include at least one of a first navigation program or navigation information indicating an object for high resolution, a second navigation program or navigation information indicating an object for low resolution, address information on a server apparatus that provide an object for low resolution, and object output mode information indicating whether scaling control of an object for high resolution is allowed or not. Also, the recording medium may additionally store metadata which records a type of information stored, an identifier of information, and a location of a storage region in which information is stored.

Figure 12:
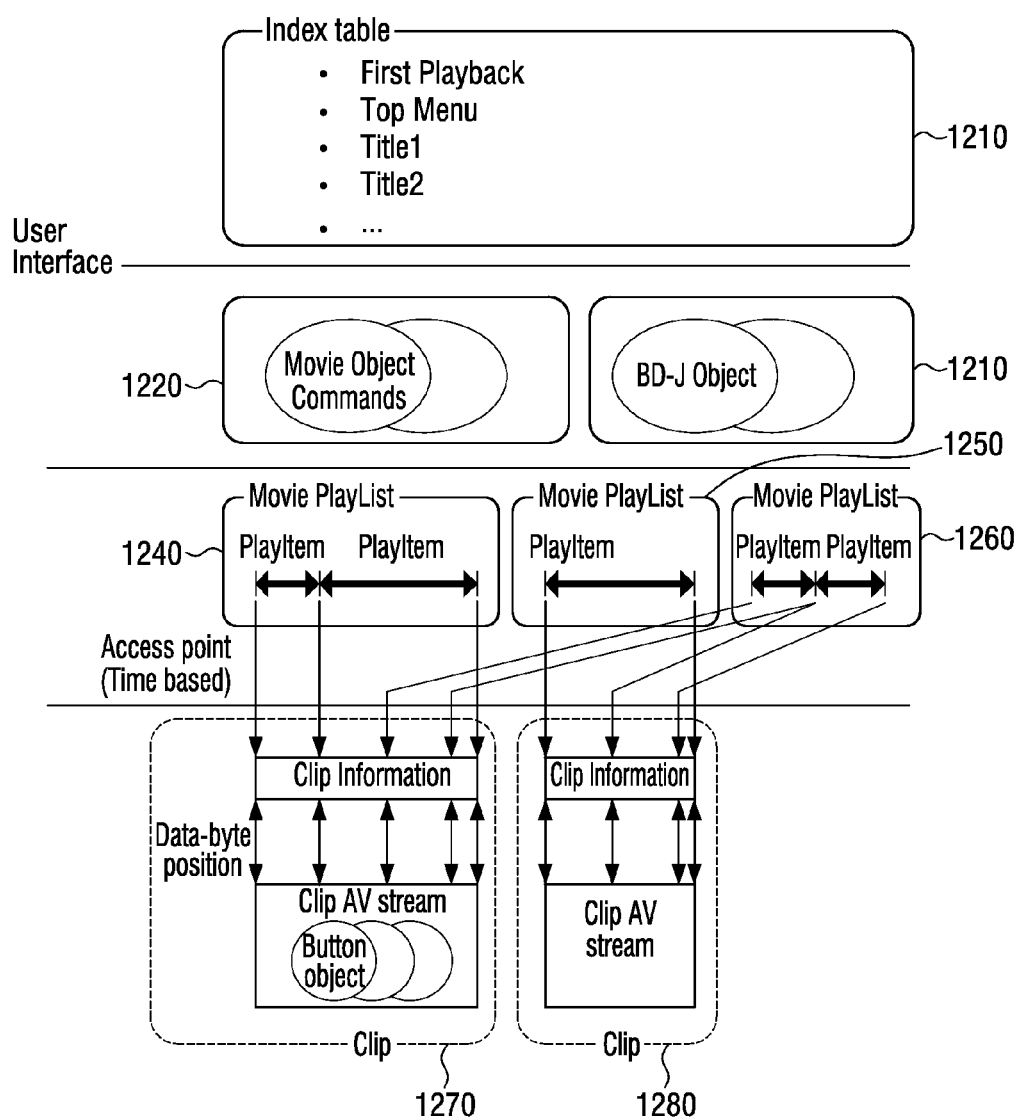
FIG. 12 is a view illustrating a data structure of a recording medium according to an exemplary embodiment.

FIG. 12 illustrates an example of a data structure of an optical disk which includes a video frame. Specifically, FIG. 12 illustrates a data structure of a Blu-ray Disc-Read Only Memory (BD-ROM) which stores content such as a movie.

As shown in FIG. 12, the BD-ROM comprises four layers, an index table 1210, a movie object 1220/BD-J object 1210, playlists 1240 and 1260, and clips 1270 and 1280.

The index table 1210 provides indexing information of the BD-ROM including a top menu, chapters, titles, etc. of the content stored on the BD-ROM.

The movie object 1220 provides information, functions and commands associated with the movie on BD-ROM. The BD-J object contains the index table of the BD-ROM.

The clips 1270 and 1280 each consist of a clip AV stream file which is a video stream file and a clip information file which is an attribute file of a database format associated with the clip AV stream file.

The playlists 1240 and 1260 are information structures that indicate the order in which the bit streams should be reproduced, and consist of a plurality of play items. It is common that the playlist constitutes content such as a movie or a drama and the play item constitutes a chapter of the content. The play item of the play list informs what a video stream, an audio stream, a subtitle stream, and a menu stream to be reproduced indicate, and specifically, informs what stream ID (or stream number) has what stream attribute. For example, in the case of a video, the play item informs a video format, a frame rate, or a subtitle. In the case of a sound, the play item informs a stream attribute such as a language code.

A variety of additional information which is additionally stored in the recording medium according to the above-described exemplary embodiments is recorded on an appropriate location in the recording medium according to their respective attributes.

Figure 13:
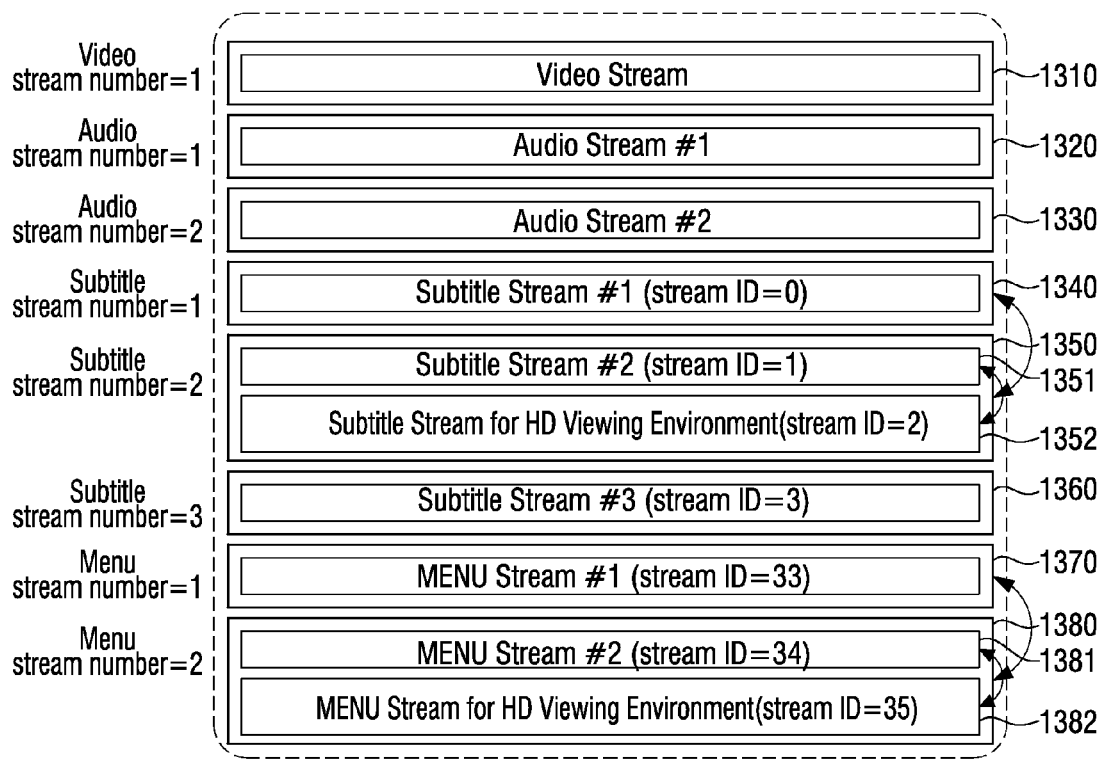
FIG. 13 is view to explain a structure of a data stream stored in a recording medium according to an exemplary embodiment.

FIG. 13 illustrates a stream structure of a recording medium if an object for low resolution such as an HD subtitle or an HD menu is stored in the recording medium according to the first exemplary embodiment.

FIG. 13 illustrates the stream structure of the recording medium according to the exemplary embodiment.

According to FIG. 13, the recording media according to the exemplary embodiment store a video streams 1310, audio streams #1 and #2 1320 and 1330, a subtitle stream #1 1340, a subtitle stream #2 1350, a subtitle stream #3 1360, a menu stream #1 1370, and a menu stream #2 1380.

In addition, in FIG. 13 the recording medium according to the exemplary embodiment further includes HD subtitle data 1352 and HD menu data 1382, besides the subtitle stream #2 1350, UHD subtitle data 1351 in the menu stream #2 1380, and UHD menu data 1381. Accordingly, the content processing apparatus may selectively output the subtitle stream #2 1350 of the recording medium and the UHD object or the HD object in the menu stream #2 1380 according to a viewing environment.

Figure 14:
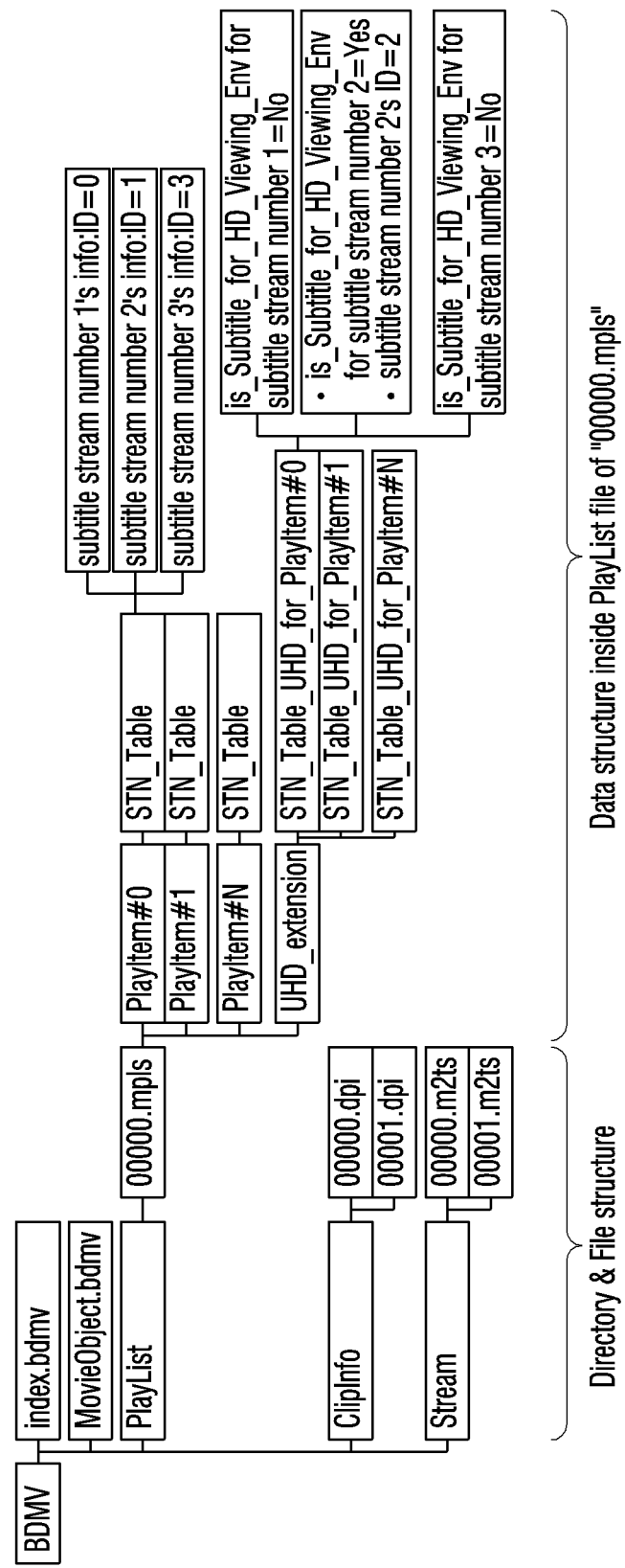
FIG. 14 is a view illustrating an example of an information structure indicating that there is an object for an HD viewing environment in a stream structure of a recording medium according to an exemplary embodiment.

FIG. 14 illustrates an example of an information structure of a recording medium if an object for low resolution exists as shown in FIG. 13.

Referring to FIG. 14, a playlist layer 1240 of a recording medium provides information such as "is_Subtitle_for_HD_Viewing" indicating whether there is a subtitle for an HD viewing environment on UHD play items.

The content processing apparatus having the configuration of FIG. 6 may process a subtitle or a menu using the recording medium having the data structure of FIGS. 13B and 14.

Specifically explaining the structure of FIGS. 13 and 14 by way of an example, it is assumed that a play item #0 is currently reproduced. First, the user may select the subtitle stream #2 using a remote controller or other inputting means. In this case, the content processing apparatus 100 selects the subtitle stream #2 according to the user's selection. The content processing apparatus 100 determines whether a current output situation is an HD viewing environment or not. In the illustrated example, the current viewing environment is an HD environment. A method for determining a viewing environment has been described above and thus an overlapped explanation is omitted.

In this case, the content processing apparatus 100 analyzes a STN_Table of a play item #0 of a 00000.mpls file and determines that a stream ID of a subtitle to be reproduced is 1. If a viewing environment value indicates a UHD viewing environment, the content processing apparatus finishes the operation of selecting a subtitle. However, if the viewing environment value indicates an HD viewing environment, the content processing apparatus performs the next operation.

That is, the content processing apparatus 100 identifies a UHD extension of the 00000.mpls file and determines whether there is a subtitle to be used in the HD viewing environment. The content processing apparatus 100 finally determines a stream ID to be used in reproduction. The content processing apparatus 100 determines whether "is_Subtitle_for_HD_Viewing" information of the playlist information structure has a value of Yes. If the information has the value of Yes, the content processing apparatus 100 decides to reproduce a stream ID 2 associated with this information. On the other hand, if the information has a value of No, the content processing apparatus 100 decides to reproduce a stream ID 1. Since the "is_Subtitle_for_HD_Viewing" information regarding the stream ID 2 has the value of Yes in FIG. 14, the stream ID 2 is reproduced. As a result, an HD subtitle is added to the video frame and is output.

As described above, the object such as a subtitle or a menu may be manufactured and stored in the recording medium in a bitmap format. However, this should not be considered as limiting and the object may be stored in a text format.

Figure 15:
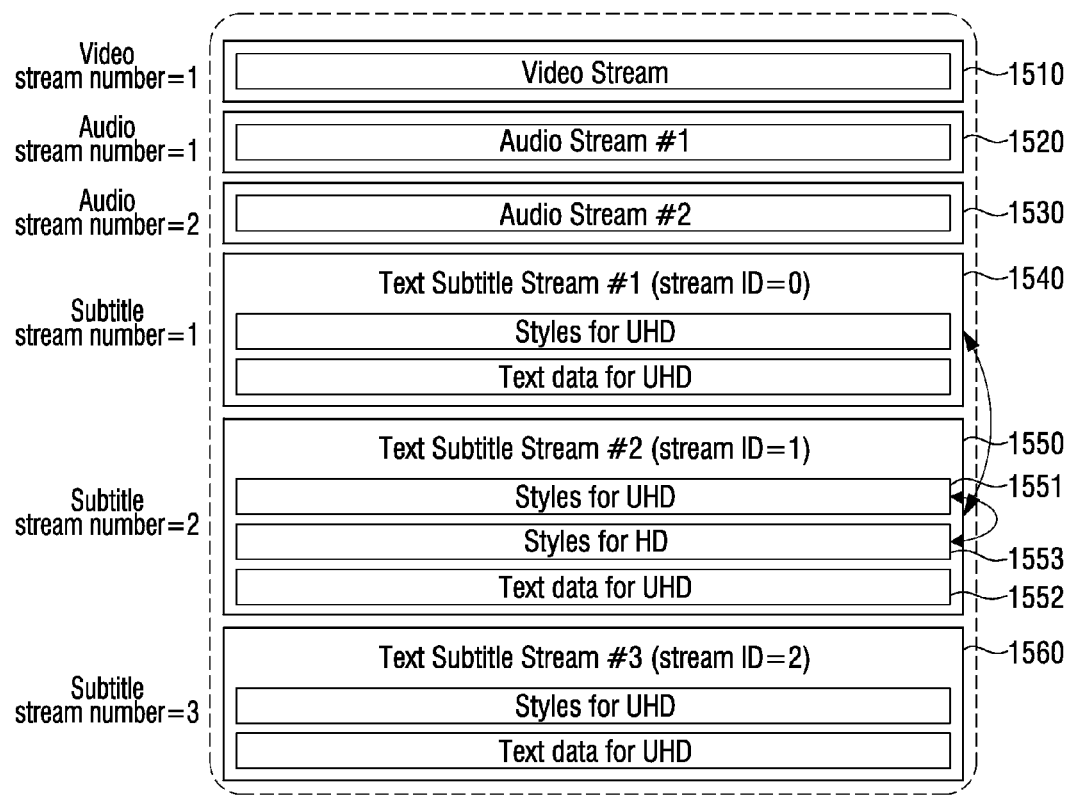
FIG. 15 is a view to explain a structure of a data stream stored in a recording medium according to an exemplary embodiment.

FIG. 15 illustrates an example of a stream structure of a recording medium which stores a subtitle and a menu generated in a text format.

FIG. 15 illustrates the stream structure of the recording medium according to an exemplary embodiment.

According to FIG. 15, the recording media store a video stream 1510, audio streams #1 and #2 1520 and 1530, a subtitle stream #1 1540, a subtitle stream #2 1550 and a subtitle stream #3 1560.

In addition, the recording media includes HD style data 1553, UHD text data 1552 and UHD style data 1551 in the subtitle stream #2 1550.

The UHD text data 1552 includes a code value of a character such as a letter or a figure constituting the subtitle. The style data refers to a style in which corresponding text data is output. If the content processing apparatus 100 is connected to a UHD display apparatus 200, the content processing apparatus 100 generates a UHD subtitle by processing the UHD text data 1552 using the UHD style data 1551. On the other hand, if the content processing apparatus 100 is connected to an HD display apparatus 300, the content processing apparatus 100 generates an HD subtitle by processing the UHD text data 1552 using the HD style data 1553.

In such a recording medium, an information structure as shown in FIG. 14 may be used. That is, if the information "is_Subtitle_for_HD_Viewing" is a value of Yes and a viewing environment is an HD environment, the controller 130 of the content processing apparatus 100 generates a subtitle using the HD style data 1553, and if not, generates a subtitle using the UHD style data 1551.

Although only the subtitle stream is illustrated in FIG. 15, a menu stream may be processed in a similar method to that of the subtitle stream.

The operation and the detailed elements of the content processing apparatus according to various exemplary embodiments have been described above. Hereinafter, a content processing method of a content processing apparatus according to exemplary embodiments will be explained using a flowchart.

Figure 16:
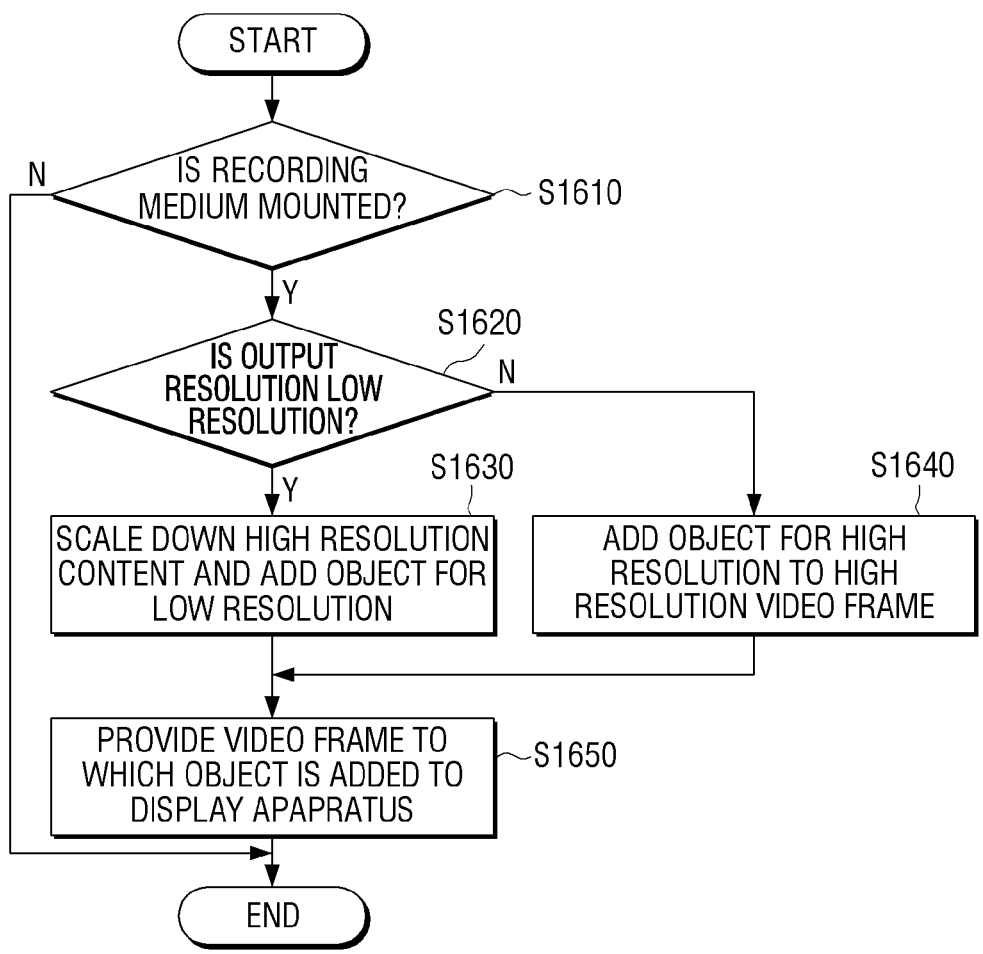
FIG. 16 is a flowchart to explain a method for processing content according to an exemplary embodiment.

FIG. 16 is a flowchart to explain a method for processing content in a content processing apparatus which is embodied in a form of a recording medium reproducing apparatus. Referring to FIG. 16, if a recording medium is mounted (S1610), the content processing apparatus identifies a viewing environment of a display apparatus connected thereto and determines whether an output resolution is a low resolution or not (S1620).

If the output resolution is a low resolution, the content processing apparatus scales down high resolution content and adds an object for low resolution to the high resolution content (S1630). The object for low resolution may be obtained in various methods as described above. The content processing apparatus provides a video frame to which the object for low resolution is added to the display apparatus (S1650).

On the other hand, if the output resolution is a high resolution which is in accord with processing of the content, the content processing apparatus adds an object for high resolution to the high resolution video frame (S1640) and provides the video frame to the display apparatus (S1650).

As described above, a subtitle or a menu which is suitable for a resolution of the display apparatus is displayed so that the subtitle or the menu can be easily identified.

As described above, a method for obtaining an object for low resolution may be different according to exemplary embodiments. Hereinafter, an operation of generating a frame by generating an object for low resolution and mixing the object for low resolution with a video frame will be explained according to exemplary embodiments.

Figure 17:
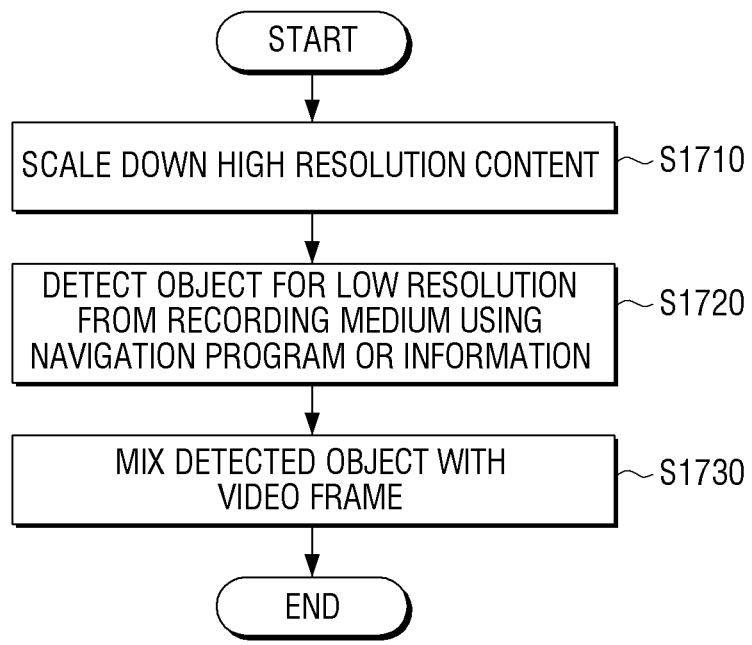
FIGS. 17 to 19 are flowcharts to explain a process of processing video data and an object of content in the content processing method according to various exemplary embodiments.

FIG. 17 is a flowchart to explain a method for processing content according to an exemplary embodiment. Referring to FIG. 17, the content processing apparatus detects video data by de-multiplexing high resolution content, generates a video stream by decoding the video data, and scales down the video stream, thereby generating a video stream which fits to a low resolution display apparatus (S1710).

The content processing apparatus detects an object for low resolution which is stored in a recording medium using a navigation program or navigation information stored in the recording medium (S1720). If the navigation program is used, the controller 130 of the content processing apparatus loads the navigation program into a RAM and executes the navigation program, thereby detecting the object according to the program. If the navigation information is used, the controller 130 analyzes the navigation information and identifies a location in which the object for low resolution is stored, and then reads out the object from the location.

The content processing apparatus 100 mixes the detected low resolution object with the video frame (S1730). A buffer may be used in the mixing operation. However, since the processing operation such as mixing is a general operation, additional elements for this operation have not been illustrated and not explained in the above exemplary embodiments.

Figure 18:
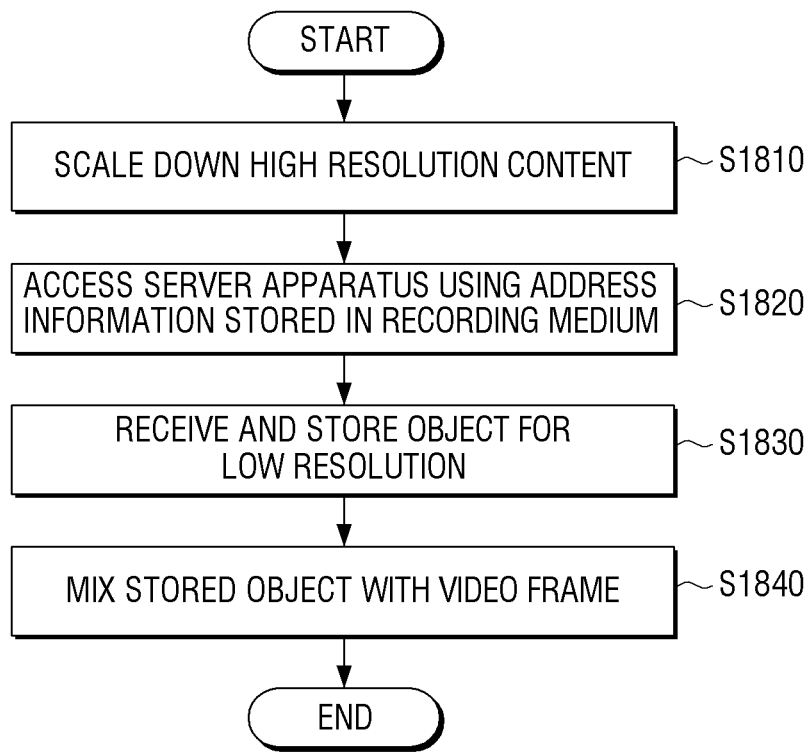

FIG. 18 is a flowchart to explain a method for processing content according to an exemplary embodiment. Referring to FIG. 18, the content processing apparatus scales down a video frame of high resolution content (S1810) and accesses a server apparatus using address information stored in a recording medium (S1820). The server apparatus may transmit data regarding an object for low resolution corresponding to the high resolution content. The content processing apparatus receives and stores the object for low resolution (S1830), and detects the stored object at a time that each object should be displayed and mixes the object with the video frame (S1840).

Figure 19:
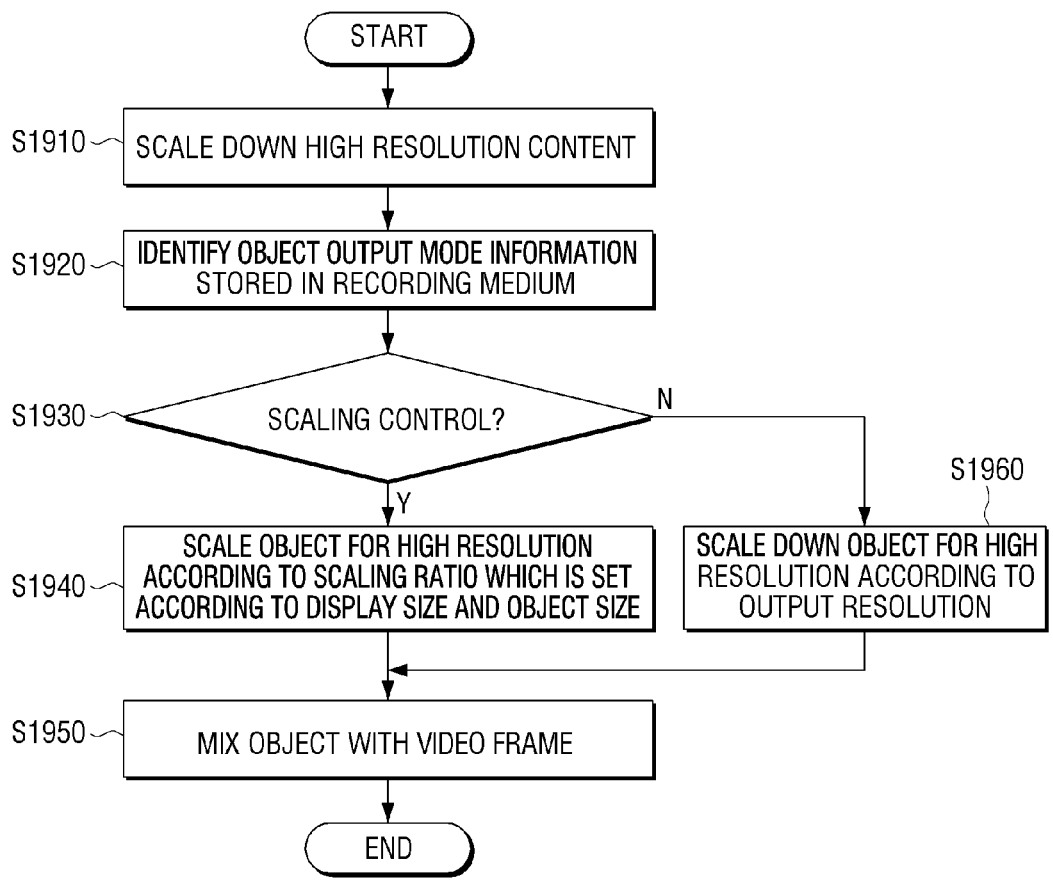

FIG. 19 is a flowchart to explain a method for processing content according to an exemplary embodiment. Referring to FIG. 19, the content processing apparatus scales down a video frame of high resolution content (S1910) and identifies object output mode information stored in a recording medium (S1920). As a result of the identifying, if scaling control is allowed (S1930), the content processing apparatus scales the object for high resolution according to a scaling ratio which is set according to a display size and an object size (S1940). Principle and method for setting the scaling ratio have been described in FIG. 11 and thus an overlapped explanation thereof is omitted. The content processing apparatus 100 mixes the scaled object with the video frame (S1950).

If scaling control is not allowed (S1930), the content processing apparatus scales down the object for high resolution according to an output resolution (S1960). In this case, if UHD content is to be displayed on an HD display apparatus, a subtitle or a menu may be reduced by about ¼.

In FIGS. 17 to 19, the operation of processing the video frame precedes the operation of processing the object. However, the order of processing may be changed according to a product. For example, the object may be processed first and then the video frame may be processed. The two processes may be performed in parallel. Also, in FIGS. 17 to 19, a low resolution display apparatus is connected by way of an example. An operation performed if a high resolution display apparatus is connected has been described above and thus an overlapped explanation is omitted.

Although the configuration and the operation of the content processing apparatus which is embodied in the form of the recording medium reproducing apparatus have been described in detail, the content processing apparatus may be embodied by a display apparatus, for example, a TV. In this case, high resolution content may not be reproduced through a recording medium and may be received through a broadcasting network.

Figure 20:
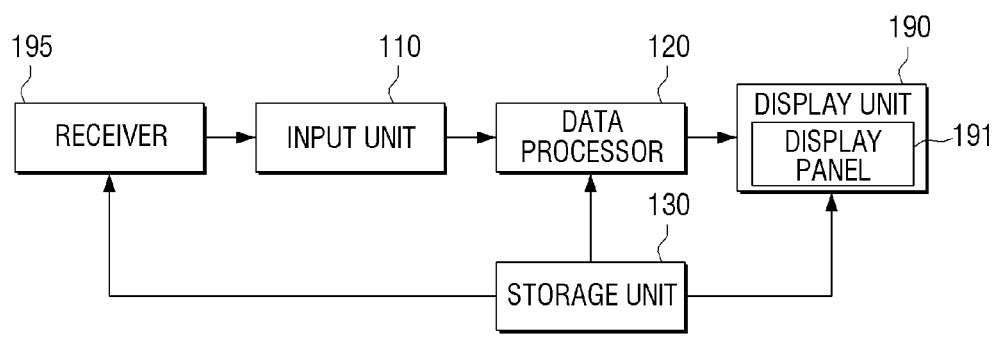
FIG. 20 is a block diagram illustrating a content processing apparatus which is embodied in a form of a display apparatus according to an exemplary embodiment.

FIG. 20 is a block diagram illustrating a content processing apparatus which is embodied in a form of a display apparatus. Referring to FIG. 20, the content processing apparatus 100 includes an input unit 110, a data processor 120, a controller 130, a receiver 195, and a display unit 190.

The receiver 195 may have a different configuration according to a broadcasting communication standard adopted by a country in which the content processing apparatus is used. There are various digital broadcasting standards such as advanced television system committee (ATSC), digital video broadcasting (DVB), and integrated services digital broadcasting-terrestrial (ISDB-T). If the ATSC is adopted from among these standards, the receiver 195 may include an antenna, an RF down converter, a demodulator, and an equalizer. The data processor 120 may include a de-multiplexer, an RS decoder, and a de-interleaver. Since detailed elements for transmitting and receiving signals according to each broadcasting standard are disclosed in a document of each broadcasting standard, detailed illustration and explanation are omitted.

The receiver 195 receives a signal including high resolution content through a broadcasting network and inputs the signal to the input unit 110.

The input unit 110 transmits the high resolution content to the data processor 120.

The display unit 190 includes a display panel 191. Accordingly, in the present exemplary embodiment, the controller 130 may directly grasp a characteristic of the display panel using specification information recorded on an internal memory or a storage unit without having to grasping a characteristic of a display panel provided in an external apparatus, that is, a viewing environment.

If the display panel 191 is for a low resolution and if it is determined that the high resolution content is received through the receiver 195, the controller 130 controls the data processor 120 to perform the operations according to the above-described exemplary embodiments.

The display unit 190 displays a video frame to which an object for low resolution is added through the display panel. The display unit 190 may further include a backlight unit or other driving circuits besides the display panel.

If the high resolution content is provided through the broadcasting network as shown in FIG. 20, additional information described above may be recorded on various fields in the broadcast signal and may be transmitted. For example, an object for low resolution may be transmitted in a format of an independent elementary stream (ES) like a video stream, an audio stream, and high resolution subtitle data, and other information may be transmitted in various methods such as terrestrial virtual channel table (TVCT), event information table (EIT), program map table (PMT), and a metadata stream.

The methods for processing the content described above may be coded and provided in a format of a program. This program may be recorded on a non-transitory readable medium.

For example, the method for processing the content, which includes receiving high resolution content, generating a video frame by processing the high resolution content, if an output resolution of a display panel to display the video frame is a low resolution, forming an object corresponding to the high resolution content as an object for low resolution, and adding the object for low resolution to the video frame, may be recorded on a non-transitory readable medium and distributed.

An apparatus in which the non-transitory readable medium on which such a program is recorded is mounted may perform the above-described methods for processing the content.

The non-transitory readable medium refers to a medium that stores data semi-permanently rather than storing data for a very short time, such as a register, a cache, and a memory, and is readable by an apparatus. Specifically, the above-described various applications or programs may be stored in a non-transitory readable medium such as a CD, a DVD, a hard disk, a Blu-ray disk, a USB, a memory card, and a ROM, and may be provided.

The foregoing exemplary embodiments and advantages are merely exemplary and are not to be construed as the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A content processing apparatus comprising:
an input unit which receives high resolution content;
a data processor which generates a video frame by processing the high resolution content; and
a controller which determines an output resolution of a display panel based on display characteristic information, and in response to the output resolution of the display panel, which is to display the video frame, being lower than a resolution of the high resolution content, controls the data processor to form an object corresponding to the high resolution content as an object for low resolution and add the formed object for low resolution corresponding to high resolution content to the video frame to be displayed with the video frame,
wherein the display characteristic information comprises information regarding at least one of the output resolution of the display panel provided in display apparatus, a pixel count, a display size, a viewing distance, and an apparatus model name.

2. The content processing apparatus as claimed in claim 1, further comprising:
a driver which, if a recording medium on which the high resolution content is recorded is mounted, detects the high resolution content from the recording medium; and
an interface which, if the content processing apparatus is connected to a display apparatus, receives display characteristic information of the display apparatus and provides the display characteristic information to the controller, and provides the video frame to which the object for low resolution is added to the display apparatus,
wherein the input unit receives the high resolution content detected by the driver.

3. The content processing apparatus as claimed in claim 2, wherein the recording medium stores high resolution content, type information indicating a type of the high resolution content, a first object, a first navigation program or first navigation information informing that the first object is the object for high resolution, a second object, and a second navigation program or second navigation information informing that the second object is the object for low resolution, wherein the first object and the second object comprise at least one of a subtitle and a content menu.

4. The content processing apparatus as claimed in claim 3, wherein the data processor comprises:
a scaler which scales down the video frame of the high resolution content; and
a mixer which selectively detects one of the first object and the second object and mixes the detected object with the scaled down video frame,
wherein, if it is determined that the output resolution of the display panel is lower than the resolution of the high resolution content based on the display characteristic information, the controller controls the data processor to scale down the video frame of the high resolution content, to detect the second object according to the second navigation program or second navigation information, and to add the second object to the scaled down video frame.

5. The content processing apparatus as claimed in claim 2, wherein the recording medium stores the high resolution content, type information indicating a type of the high resolution content, the object for high resolution, and address information on a server apparatus which provides the object for low resolution.

6. The content processing apparatus as claimed in claim 5, further comprising
a communication unit which accesses the server apparatus according to the address information,
wherein the data processor comprises:
a scaler which scales down the video frame of the high resolution content;
an object storage which stores an object for low resolution received from the server apparatus; and
a mixer which detects whether the object for low resolution is recorded on the recording medium or stored in the object storage, and mixes the detected object for low resolution with the scaled-down video frame,
wherein, if it is determined that the output resolution of the display panel is lower than the resolution of the high resolution content based on the display characteristic information, the controller controls the communication unit to access the server apparatus using the address information and receive the object for low resolution,
wherein, after the object for low resolution is received and stored in the object storage, the controller controls the data processor to scale down the video frame of the high resolution content and add the object for low resolution stored in the object storage to the scaled-down video frame.

7. The content processing apparatus as claimed in claim 2, wherein the recording medium stores the high resolution content, type information indicating a type of the high resolution content, an object for high resolution, and object output mode information indicating whether scaling control is to be performed with respect to the object for high resolution.

8. The content processing apparatus as claimed in claim 7, wherein the data processor comprises:
a first scaler which scales the video frame of the high resolution content;
a second scaler which scales the object for high resolution; and
a mixer which mixes the video frame which is output from the first scaler and the object which is output from the second scaler,
wherein, if it is determined that the output resolution of the display panel is lower than the resolution of the high resolution content based on the display characteristic information and if it is determined that the scaling control is allowed based on the object output mode information, the controller controls the data processor to scale down the video frame of the high resolution content, to scale the object for high resolution according to a scaling ratio which is determined based on a display size and an object size of the display panel, and to mix the scaled object with the scaled down video frame.

9. The content processing apparatus as claimed in claim 1, further comprising:
a receiver which receives a signal comprising the high resolution content through a broadcasting network and inputs the signal to the input unit; and
a display which comprises the display panel and displays the video frame to which the object for low resolution is added.

10. A method for processing content, the method comprising:
detecting high resolution content on a recording medium;
determining an output resolution of a display apparatus to display the high resolution content based on display characteristic information;
in response to determining that the output resolution of the display apparatus is lower than a resolution of the high resolution content, generating a video frame by processing the high resolution content, forming an object corresponding to the high resolution content as an object for low resolution, and adding the formed object for low resolution corresponding to the high resolution content to the video frame; and
displaying the video frame and the object for low resolution is added to the display apparatus,
wherein the display characteristic information comprises information regarding at least one of the output resolution of the display panel provided in display apparatus, a pixel count, a display size, a viewing distance, and an apparatus model name.

11. The method as claimed in claim 10, wherein the recording medium stores high resolution content, type information indicating a type of the high resolution content, a first object, a first navigation program or first navigation information informing that the first object is an object for high resolution, a second object, and a second navigation program or second navigation information informing that the second object is the object for low resolution,
wherein the first object and the second object comprise at least one of a subtitle and a content menu.

12. The method as claimed in claim 11, wherein the generating the video frame comprises:
if it is determined that the output resolution is lower than the resolution of the high resolution content, scaling down the video frame of the high resolution content, selectively detecting the second object using the second navigation program or second navigation information, and adding the second object to the scaled down video frame; and
if it is determined that the output resolution is a high resolution corresponding to the high resolution content, selectively detecting the first object using the first navigation program or first navigation information and mixing the first object with the video frame of the high resolution content.

13. The method as claimed in claim 11, wherein the recording medium stores the high resolution content, type information indicating a type of the high resolution content, an object for high resolution, address information on a server apparatus which provides the object for low resolution.

14. The method as claimed in claim 13, wherein the generating the video frame comprises:
- if it is determined that the output resolution is lower than the resolution of the high resolution content, scaling down the video frame of the high resolution content, accessing the server apparatus using the address information and receiving the object for low resolution, and mixing the received object with the scaled down video frame; and
- if it is determined that the output resolution is a high resolution corresponding to the high resolution content, mixing the object for high resolution with the video frame of the high resolution content.

15. The method as claimed in claim 10, wherein the recording medium stores the high resolution content, type information indicating a type of the high resolution content, an object for high resolution, and object output mode information indicating whether scaling control is to be performed with respect to the object for high resolution.

16. The method as claimed in claim 15, wherein the generating the video frame comprises:
- if it is determined that the output resolution is lower than the resolution of the high resolution content and if it is determined that the scaling control is allowed based on the object output mode information, scaling down the video frame of the high resolution content, scaling the object for high resolution according to a scaling ratio which is determined based on a display size and an object size of the display apparatus, and mixing the object for high resolution with the scaled down video frame;
- if it is determined that the output resolution is lower than the resolution of the high resolution content and if it is determined that the scaling control is not allowed based on the object output mode information, scaling down the video frame of the high resolution content, scaling down the object for high resolution according to the output resolution, and mixing the scaled down object with the video frame; and
- if it is determined that the output resolution is a high resolution corresponding to the high resolution content, mixing the object for high resolution with the video frame of the high resolution content.

17. A non-transitory readable medium which stores a program to perform a method for processing content, the method comprising:
- receiving high resolution content;
- generating a video frame by processing the high resolution content;
- determining an output resolution of a display apparatus to display the high resolution content based on display characteristic information; and
- in response to the output resolution of the display panel to display the video frame being lower than a resolution of the high resolution content, forming an object corresponding to the high resolution content as an object for low resolution and adding the formed object for low resolution corresponding to high resolution content to the video frame to be displayed with the video frame,
- wherein the display characteristic information comprises information regarding at least one of the output resolution of the display panel provided in display apparatus, a pixel count, a display size, a viewing distance, and an apparatus model name.

18. A recording medium comprising a video frame, the recording medium further comprising:
- a first storage region in which high resolution content is stored;
- a second storage region in which type information indicating a type of the high resolution content is stored;
- a third storage region in which an object for high resolution is stored; and
- a fourth storage region in which additional information for displaying an object is stored,
- wherein the additional information comprises at least one of a first navigation program or information to indicate the object for high resolution, an object for low resolution, a second navigation program or information to indicate the object for low resolution, address information on a server apparatus which provides the object for low resolution, and object output mode information indicating whether scaling control is to be performed with respect to the object for high resolution.

19. The content processing apparatus as claimed in claim 1, wherein the object corresponding to the high resolution content and the object for low resolution comprise at least one from among text, a menu, and a subtitle.

* * * * *